(12) United States Patent
Take et al.

(10) Patent No.: US 10,977,102 B2
(45) Date of Patent: Apr. 13, 2021

(54) API ADAPTER, API ADAPTER CREATION METHOD, AND PROGRAM

(71) Applicant: Nippon Telegraph and Telephone Corporation, Tokyo (JP)

(72) Inventors: Naoki Take, Tokyo (JP); Kensuke Takahashi, Tokyo (JP); Hiroyuki Tanaka, Tokyo (JP); Nobuo Onai, Tokyo (JP); Hiroyuki Yazaki, Tokyo (JP); Hiroshi Kato, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 16/971,256

(22) PCT Filed: Feb. 19, 2019

(86) PCT No.: PCT/JP2019/006171
§ 371 (c)(1),
(2) Date: Aug. 19, 2020

(87) PCT Pub. No.: WO2019/163793
PCT Pub. Date: Aug. 29, 2019

(65) Prior Publication Data
US 2020/0387415 A1    Dec. 10, 2020

(30) Foreign Application Priority Data
Feb. 20, 2018 (JP) ............... JP2018-028324

(51) Int. Cl.
*G06F 3/00* (2006.01)
*G06F 9/54* (2006.01)
(52) U.S. Cl.
CPC .............. *G06F 9/547* (2013.01); *G06F 9/541* (2013.01)

(58) Field of Classification Search
CPC ........................................................ G06F 9/547
(Continued)

(56) References Cited

U.S. PATENT DOCUMENTS

2002/0128919 A1* 9/2002 Rime ................. G06Q 30/0635
705/26.81
2020/0371779 A1* 11/2020 Kesiboyana ......... G06K 9/6267

OTHER PUBLICATIONS

WesLee Frisby, Security Analysis of Smartphone Point-of-Sale Systems. (Year: 2012).*
(Continued)

*Primary Examiner* — Lechi Truong
(74) *Attorney, Agent, or Firm* — Fish & Richardson P.C.

(57) ABSTRACT

[Problem] To provide an API adapter, an API adapter creation method, and a program capable of efficiently creating an API adapter unit.
[Solution] An API adapter creation method includes an order reception unit incorporation process for receiving a single order 31 and performing a process for response to a cooperative execution device main unit 20, an API calling logic unit creation process for extracting a parameter necessary for execution of a wholesale service provider API 50 from within the single order 31 and converting an execution result of the wholesale service provider API 50 to a data format distributable to the cooperative execution device main unit 20, a wholesale service provider API execution unit creation and incorporation process for receiving data necessary for execution of a wholesale service provider API, reassembling the data into in the form of an HTTP request, transmitting the resultant data to a wholesale service provider 2, reassembling the data in an appropriate format, and returning the data to an API calling logic unit 120.

14 Claims, 15 Drawing Sheets

(58) Field of Classification Search
USPC .......................................................... 719/310
See application file for complete search history.

(56) References Cited

OTHER PUBLICATIONS

Takahashi et al., "Architecture for flexible service cooperation among multiple providers—A System Architecture for Flexible Coordination Fulfillment among Multiple Service Providers," Collection of Lecture Notes from the 2017 IEICE Communications Society Conference, Aug. 29, 2017, p. 245, 3 pages (with English Translation).

Takahashi et al., "Orchestrator for service coordination between multiple operators," Technical Research Report by the Institute of Electronics, Information and Communication Engineers, 2018, 117(491):91-96, 13 pages (with English Translation).

Take et al., "A Study on Web API Adapter Development Ease," NTT Network Service Systems Laboratories, NTT Corporation, Network Software (NWS) Study Group Position Paper Lecture, Oct. 19, 2017, 3 pages (with English Translation).

Take et al., "Applicability of the Swagger Codegen to API Adapter development," Collection of Lecture Notes from the 2018 IEICE Conference, Mar. 6, 2018, p. 331, 5 pages (with English Translation).

\* cited by examiner

API ADAPTER, API ADAPTER CREATION METHOD, AND PROGRAM

CROSS-REFERENCE TO RELATED APPLICATIONS

This application is a National Stage application under 35 U.S.C. § 371 of International Application No. PCT/JP2019/006171, filed on Feb. 19, 2019, which claims the benefit of Japanese Patent Application No. 2018-028324, filed on Feb. 20, 2018. The disclosures of the prior applications are incorporated by reference in their entirety.

TECHNICAL FIELD

The present invention relates to an API adapter, an API adapter creation method, and a program.

BACKGROUND ART

In recent years, a communication service of a business to business to X (B2B2X) model that provides services to end users using digital services of other providers rather than building all using facilities of a provider has become popular when new digital services are created by the provider.

With the spread of B2B2X, the importance of a cooperative execution device for a plurality of services for combining a plurality of wholesale partner services to build and operate a service is increasing. Due to the advent of new wholesale services and frequent changes in existing service specifications, a service provider is required to follow new wholesale services and changes in existing service specifications at low cost and in a short time.

Further, each provider provides an application program interface (API) on a web to manage services, and a user builds and operates services through software that calls the API. A specification of the API (a name of the API, a uniform resource locator (URL), parameters, or the like) is defined by each provider, and users use the API according to this definition. In recent years, more APIs have been provided by providers, and it is common for a single provider to provide a plurality of APIs for a service or for a plurality of providers to provide the similar API for a service.

When a service provider develops a device that collectively builds a cooperation service that is a combination of networks, clouds, and applications of a plurality of wholesale service providers providing wholesale services, costs of follow-up are generated each time new services or APIs are added to wholesale services.

There is a technology described in Non-Patent Literature 1 as an architecture which facilitates cooperation of wholesale services of a plurality of providers to realize a new service or API follow-up development in a flexible manner.

Non-Patent Literature 1 proposes a cooperative execution device and an architecture thereof (which is separated into a service-independent unit and a service-dependent unit (an adapter unit)) for a plurality of services. Specifically, a catalog driven architecture, in which specifications of services of a plurality of providers are described as a catalog, is adopted, and "components" and "action rules" are separated as a catalog description method. An execution cooperation scheme for a plurality of services has been proposed, in which a service-independent unit that interprets and executes a catalog and a service-dependent unit that executes an API for each service are loosely coupled and thus follow-up of a new service or API can be realized in a flexible manner. This makes it possible to handle new services or APIs simply by adding a service-dependent unit when handling new services or APIs.

Non-Patent Literature 2 describes an API adapter including an orchestrator/individual service API transmission and reception unit ("/" indicates "and/or"; the same applies hereinafter) that performs transmission and reception of information to and from an orchestrator unit/individual service, an order reception unit that performs reception of an order from the orchestrator and a response process, an API calling logic unit that describes an API calling logic of an individual service (sequence of execution, designation of input and output parameters, or the like), and an orchestrator/individual API wrapper unit that performs information acquisition from the orchestrator/individual service and registration instead to provide functions in units which are easy to use for logic description.

CITATION LIST

Non Patent Literature

Non-Patent Literature 1: "Architecture to Provide Flexible Cooperation Among Multiple Service Providers Flexible", Proceedings of the IEICE Communication Society Conference 2017, Kensuke Takahashi and others, [online], [Found on Feb. 1, 2018], Internet (URL: https://www.gakkai-web.net/gakkai/ieice/S_2017/Settings/html/key/fu.html)

Non-Patent Literature 2: "Study on Facilitated Development of Web API Adapters", Naoki Take and others, Network Software (NWS) Workshop Position Paper Lecture, [online], [Found on Feb. 1, 2018], Internet (URL: http://www.ieice.org/cs/ns/nws/14/program/)

SUMMARY OF THE INVENTION

Technical Problem

However, Non-Patent Literature 1 and Non-Patent Literature 2 propose a cooperative execution device for multiple services, an architecture thereof, and API adapter function requirements, but do not propose a method of creating an adapter unit.

The present invention has been made in view of such a background, and an object of the present invention is to provide an API adapter, an API adapter creation method, and a program capable of efficiently creating an API adapter unit used in new wholesale services/specification change.

Means for Solving the Problem

In order to solve the problem described above, an invention according to claim 1 is an application program interface (API) adapter for use in a cooperative execution device for collectively building a cooperation service that is a combination of a plurality of wholesale services, the API adapter including: an order reception unit configured to receive a single order from a cooperative execution device main unit configured to disassemble an order of the cooperation service into single orders, and perform a process for response to the cooperative execution device main unit; an API calling logic unit configured to activate a wholesale service provider API in a determined sequence of execution based on an activation condition of the wholesale service provider API, extract a parameter necessary for execution of the wholesale service provider API from within the single order, transmit the parameter to a wholesale service provider API execution unit, and convert an execution result of the wholesale service provider API to a data format distributable to the cooperative execution device main unit; and a wholesale service provider API execution unit configured to receive a parameter necessary for execution of the wholesale service provider API from the API calling logic unit, and reassemble the parameter in the form of a request, make the request to the wholesale service provider API, receive a response as an execution result to the request, reassemble the response in a predetermined format, and return the response to the API calling logic unit.

Further, an invention according to claim 2 is an API adapter creation method of creating an API adapter for use in a cooperative execution device for collectively building a cooperation service that is a combination of a plurality of wholesale services, the API adapter creation method including: receiving, by an order reception unit, a single order from a cooperative execution device main unit configured to disassemble an order of the cooperation service into single orders; activating, by an API calling logic unit, a wholesale service provider API in a determined sequence of execution based on an activation condition of the wholesale service provider API; extracting a parameter necessary for execution of the wholesale service provider API from within the single order, and transmitting the parameter to a wholesale service provider API execution unit; receiving, by the wholesale service provider API execution unit, a parameter necessary for execution of the wholesale service provider API from the API calling logic unit, reassembling the parameter in the form of a request, and requesting the wholesale service provider API, receiving a response as an execution result to the request, reassembling the response in a predetermined format, and returning the response to the API calling logic unit; converting, by the API calling logic unit, an execution result of the wholesale service provider API to a data format distributable to the cooperative execution device main unit; and performing, by the order reception unit, a process for response to the cooperative execution device main unit.

Further, an invention according to claim 7 is a program for causing a computer as an API adapter for use in a cooperative execution device for collectively building a cooperation service that is a combination of a plurality of wholesale services to function as: an order reception apparatus configured to receive a single order from a cooperative execution device main unit configured to disassemble an order of the cooperation service into single orders; an API calling logic apparatus configured to activate a wholesale service provider API in a determined sequence of execution based on an activation condition of the wholesale service provider API, extract a parameter necessary for execution of the wholesale service provider API from within the single order, transmit the parameter to a wholesale service provider API execution apparatus, and convert an execution result of the wholesale service provider API to a data format distributable to the cooperative execution device main unit; and a wholesale service provider API execution apparatus configured to receive a parameter necessary for execution of the wholesale service provider API from the API calling logic apparatus, reassemble the parameter in the form of a request, make the request to the wholesale service provider API, receive a response as an execution result to the request, reassemble the response in a predetermined format, and return the response to the API calling logic apparatus.

Thus, it is possible to efficiently create an API adapter unit for use in a new wholesale service/specification change.

An invention according to claim 3 is the API adapter creation method according to claim 2, further including: automatically generating a wholesale service provider API execution unit source code based on a wholesale service provider API specification document, and generating a wholesale service provider API execution unit specification document from the automatically generated wholesale service provider API execution unit source code.

This eliminates the need for development of the wholesale service provider API execution unit. Further, it is possible to provide the generated wholesale service provider API execution unit specification document to the wholesale service provider API execution unit incorporation process in the next process.

An invention according to claim 4 is the API adapter creation method according to claim 3, further including: incorporating, by the wholesale service provider API execution unit, a common library source code and the generated wholesale service provider API execution unit source code into the API calling logic unit template source code.

Thus, with the common library source code, it is possible to incorporate the wholesale service provider API execution unit source code into the API calling logic unit template source code using common library resources efficiently. It is possible to provide the API calling logic unit template source code into which the wholesale service provider API execution unit source code has been incorporated, to the API calling logic unit creation process in the next process.

An invention according to claim 5 is the API adapter creation method according to claim 2, wherein the API calling logic unit implements an adapter unit source code based on a template source code in which a common library and a wholesale service API execution unit source code have been incorporated, and various manual and specification documents, and builds the created adapter unit source code to generate an adapter unit execution file.

Thus, because the adapter unit execution file can be efficiently created, adapting to a new API is facilitated. For example, the API adapter unit 100 can easily adapt to a new wholesale service/specification change. Thus, it is possible to efficiently create the API adapter unit by combining the wholesale service provider API execution unit generation process, the common library and wholesale service provider API execution unit incorporation process, and the API calling logic unit creation process.

An invention according to claim 6 is the API adapter creation method according to claim 5 including, by the API calling logic unit, registering the created adapter unit execution file in the API adapter.

Thus, it is possible to register the adapter unit execution file in the API adapter unit and cause the API adapter unit to adapt to a new wholesale service/specification change.

Effects of the Invention

According to the present invention, an API adapter, an API adapter creation method, and a program capable of efficiently creating an API adapter unit for use in a new wholesale service/specification change are provided.

DESCRIPTION OF EMBODIMENTS

Hereinafter, an API adapter and an API adapter creation method in a form for carrying out the present invention (hereinafter referred to as an "embodiment") will be described with reference to the drawings.

The API adapter and the API adapter creation methods are examples applied to a B2B2X model. In the B2B2X model, the wholesale service provider sells services to the service provider wholesale, the service provider creates new services using services sold wholesale, and then the service provider provides the created services to customers. The B2B2X model is an example, and may be an API adapter of any service model.

Embodiment

Figure 1:
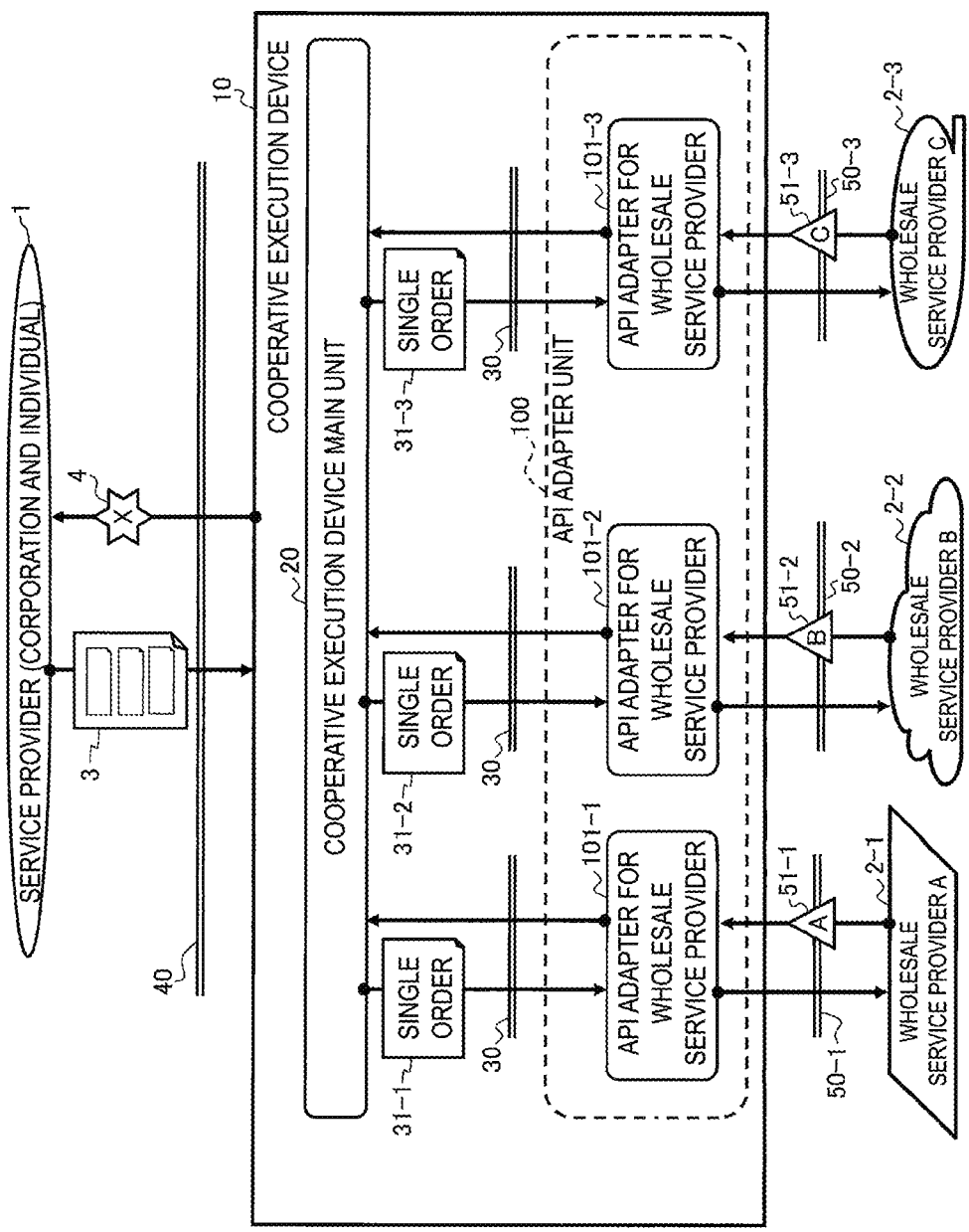
FIG. 1 is an overall configuration diagram of a network system to which an API adapter according to an embodiment of the present invention is applied.

FIG. 1 is an overall configuration diagram of a network system to which an API adapter according to an embodiment of the present invention is applied. In FIG. 1, notation indicated by a double line indicates an individual API (the same applies in each of the drawings).

As illustrated in FIG. 1, a service provider 1 issues a cooperation order 3 indicating that use of a service 4 is desired, and receives the service 4 that is a combination of wholesale services of a plurality of wholesale service providers 2-1, 2-2, and 2-3. The service provider 1 may be a corporation or an individual. The wholesale service provider 2-1, the wholesale service provider 2-2, and the wholesale service provider 2-3 are collectively referred to as a wholesale service provider 2.

A cooperative execution device 10 is disposed between the service provider 1 and the plurality of wholesale service providers 2-1, 2-2, and 2-3 providing wholesale services, to collectively build a cooperation service that is combination of networks, clouds, and applications of the wholesale service provider 2-1, 2-2, and 2-3.

The cooperative execution device API 40 serving as an interface is provided between the service provider 1 and the cooperative execution device 10.

An API 50-1 of the wholesale service provider 2-1, an API 50-2 of the wholesale service provider 2-2, and an API 50-3 of the wholesale service provider 2-2 are provided between the wholesale service provider 2-1, the wholesale service provider 2-2 and the wholesale service provider 2-3, and the cooperative execution device 10. The API 50-1 of the wholesale service provider A, the API 50-2 of the wholesale service provider B, and the API 50-3 of the wholesale service provider C are interfaces for connection of the wholesale service provider 2-1, the wholesale service provider 2-2, and the wholesale service provider 2-3 to the cooperative execution device 10.

The API 50-1 of the wholesale service provider 2-1, the API 50-2 of the wholesale service provider 2-2, and the API 50-3 of the wholesale service provider 2-3 are collectively referred to as a wholesale service provider API 50.

The cooperative execution device 10 includes a cooperative execution device main unit 20, an API adapter unit 100, and a cooperative execution device main unit API 30 that is an interface for connecting the cooperative execution device main unit 20 to the API adapter unit 100.

The API adapter unit 100 is created for each wholesale service provider 2 and absorbs an API specification difference provided by each wholesale service provider 2 (which will be described below with reference to FIG. 3). Here, the API adapter unit 100 includes an API adapter 101-1 for the wholesale service provider 2-1, an API adapter 101-2 for the wholesale service provider 2-2, and an API adapter 101-3 for the wholesale service provider 2-3, which respectively correspond to the wholesale service provider 2-1, the wholesale service provider 2-2, and the wholesale service provider 2-3. The API adapter 101-1 for the wholesale service provider 2-1, the API adapter 101-2 for the wholesale service provider 2-2, the API adapter 101-3 for the wholesale service provider 2-3 absorb API specification differences provided by the wholesale service provider 2-1, the wholesale service provider 2-2, and the wholesale service provider 2-3, respectively.

The API adapter 101-1, the API adapter 101-2, and the API adapter 101-3 are collectively referred to as an API adapter 101.

The cooperative execution device main unit 20 disassembles the cooperation order 3 issued by the service provider 1 into single orders 31-1, 31-2, and 31-3 that are processable units of the API adapter 101-1 for the wholesale service provider 2-1, the API adapter 101-2 for the wholesale service provider 2-2, and the API adapter 101-3 for the wholesale service provider 2-3, and transmits the single orders 31-1, 31-2, and 31-3 to the API adapter 101-1 for the wholesale service provider 2-1, the API adapter 101-2 for the wholesale service provider 2-2, and the API adapter 101-3 for the wholesale service provider 2-3.

The single orders 31-1, 31-2, and 31-3 are collectively referred to as a single order 31. A specific example of the single order 31 will be described below with reference to FIG. 4.

Main Roles and Functions of API Adapter

Figure 2:
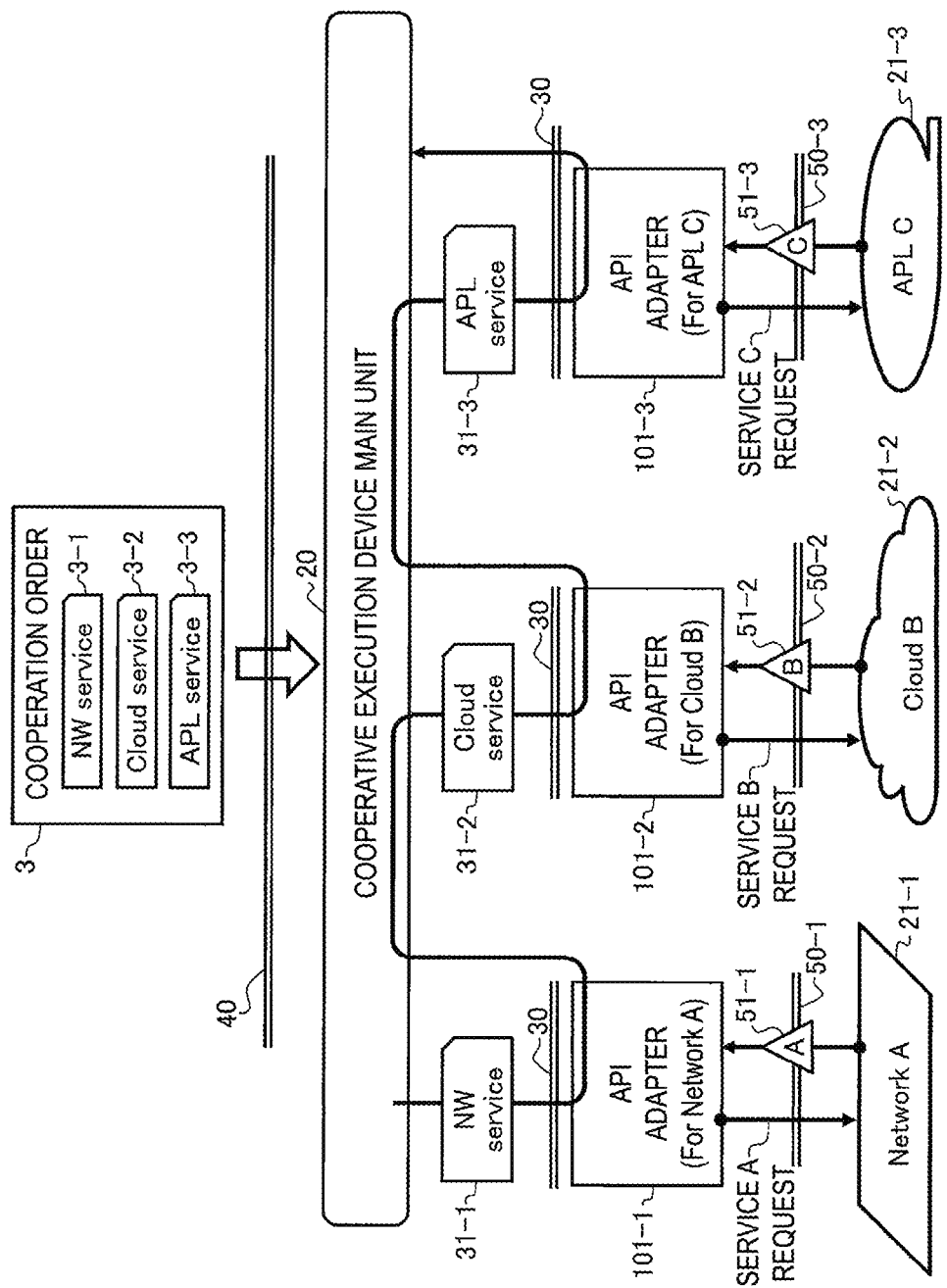
FIG. 2 is a diagram illustrating a main role and function of an API adapter according to an embodiment of the present invention.

FIG. 2 is a diagram illustrating the main roles and functions of the API adapter 101. Components corresponding to the units in FIG. 1 are denoted by the same reference signs.

The cooperation order 3 is disassembled into the single order 31-1 for a network (NW) service, the single order 31-2 for a cloud service, and the single order 31-3 for an application (APL) service in the cooperative execution device main unit 20.

It is assumed that the wholesale service provider 2-1, the wholesale service provider 2-2, and the wholesale service provider 2-3 are network A 21-1, cloud B 21-2, and APL C 21-3 in this order.

The API adapter 101-1 for the wholesale service provider 2-1, the API adapter 101-2 for the wholesale service provider 2-2, and the API adapter 101-3 for the wholesale service provider 2-3 are the API adapter 101-1 for network A, the API adapter 101-2 for cloud B, and the API adapter 101-3 for APL C.

The cooperative execution device main unit 20 disassembles the cooperation order 3 into single orders 31 and performs control of the sequence of execution. For example, the cooperative execution device main unit 20 changes an IP address assigned to data returned from a network 21-1 to a setting of the cloud 21-2 during delivery to the settings of the cloud 21-2. Such control of the sequence of execution is important.

The API adapter 101 serves to perform conversion mutually between a data model on the cooperative execution device main unit 20 side (for example, a format conforming to TMF Open APIs) and a data model on the wholesale service provider 2 side. The data model is not limited to the TMF format, and may be a proprietary format.

The API adapter 101 has a function of interpreting the single order 31 (for example, a TMF format) from the cooperative execution device main unit 20, converting the single order 31 to a call to each wholesale service API 51, converting a response value thereof to a data model (for example, a TMF format) on the main unit side, and distributing it to the cooperative execution device main unit 20.

As indicated by an arrow in FIG. 2, the API adapter 101-1 for the Network 21-1 interprets the single order 31-1 for a NW service from the cooperative execution device main unit 20, converts the single order 31-1 to an API call of the Network 21-1, and returns a response value to the cooperative execution device main unit 20 side. Subsequently, the API adapter 101-2 for the cloud 21-1 interprets the single order 31-2 for the cloud service 21-2 from the cooperative execution device main unit 20, converts the single order 31-2 to an API call of the cloud 21-2, and returns a response value to the cooperative execution device main unit 20 side. Subsequently, the API adapter 101-3 for the APL 21-3 interprets the single order 31-3 for the APL service 21-3 from the cooperative execution device main unit 20, converts the single order 31-3 to an API call of APL 21-3, converts a response value to the data model on the cooperative execution device main unit 20 side, and thus distributes the data model.

Figure 3:
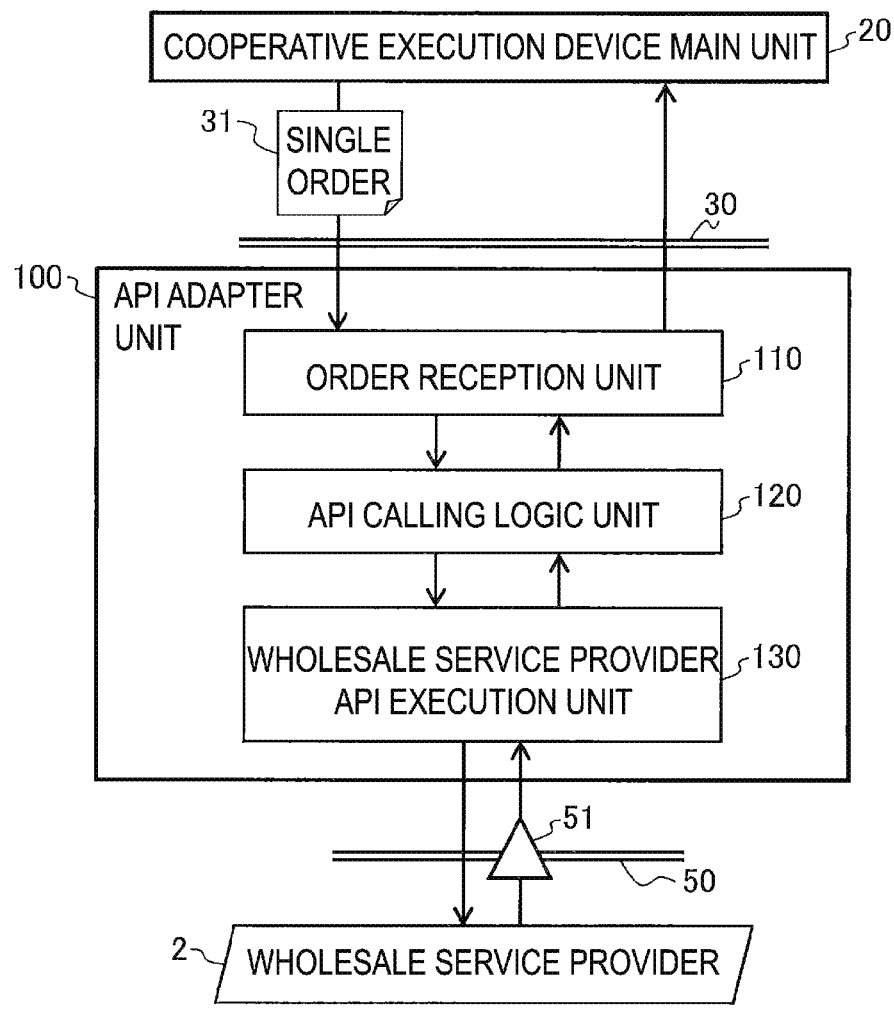
FIG. 3 is a configuration diagram illustrating the API adapter according to the embodiment of the present invention.

FIG. 3 is a configuration diagram illustrating the API adapter unit 100 in FIG. 1.

As illustrated in FIG. 3, the API adapter unit 100 receives the order from the cooperative execution device main unit 20 via the cooperative execution device main unit API 30, and returns the response to the cooperative execution device main unit 20 via the cooperative execution device main unit API 30. The cooperative execution device main unit 20 corresponds to an orchestrator in Non-Patent Literature 2, and the cooperative execution device main unit API 30 corresponds to the orchestrator API in Non-Patent Literature 2.

The API adapter unit 100 performs Hypertext Transfer Protocol (HTTP) request transmission and response reception corresponding to the individual wholesale service provider APIs 50 of the wholesale service providers 2 via the APIs 50 to and from the respective wholesale service providers 2. The wholesale service provider 2 corresponds to the individual services in Non-Patent Literature 2, and the wholesale service provider API 50 corresponds to an API of the individual services in Non-Patent Literature 2.

The API adapter unit 100 interprets the order received from the cooperative execution device main unit 20 (an orchestrator) side, calls the wholesale service provider API 50 (an API of the individual service) in a predetermined order, and distributes the result thereof to the cooperative execution device main unit 20 (the orchestrator).

The API adapter unit 100 includes an order reception unit 110 (an order reception apparatus), an API calling logic unit 120 (an API calling logic apparatus), and a wholesale service provider API execution unit 130 (a wholesale service provider API execution apparatus).

Order Reception Unit 110

The order reception unit 110 receives the single order 31 from the cooperative execution device main unit 20 and acquires order content. The order reception unit 110 performs a response process to the cooperative execution device main unit 20. Specifically, as a cooperation order reception/response process, the order reception unit 110 performs state management and notification from the reception of the single order 31 to completion of execution of the single order 31, and distribution of execution results according to a procedure that is determined in advance with respect to the cooperative execution device main unit 20.

As an order content acquisition process, the order reception unit 110 receives a request of the API calling logic unit 120 and acquires detailed order content (catalog/order parameter). A process of the order reception unit 110 will be described below with reference to FIG. 5.

When stating in relation to Non-Patent Literature 2, the order reception unit 110 assembles and transmits an HTTP request and receives a response, as an orchestrator API transmission and reception function. The order reception unit 110 performs order reception as an order reception function, and response process to the cooperative execution device main unit 20 (the orchestrator). The order reception unit 110, as an orchestrator API wrapper function, performs the cooperative execution device main unit 20 (orchestrator) API information acquisition instead and provides functions in units easy to use for logic description.

For the orchestrator API transmission and reception and individual service API transmission and reception to be described below, a typical HTTP transmission and reception process is simply performed. Therefore, it is possible to utilize a public library for an HTTP transmission and reception process or reuse an already developed one. Use of a common library (to be described with reference to FIG. 6) makes it unnecessary to develop these.

API Calling Logic Unit 120

The API calling logic unit 120 checks an activation condition of the wholesale service provider API 50 and activates an API in a determined sequence of execution.

The API calling logic unit 120 extracts the parameter necessary for execution of the wholesale service provider API 50 from within the order from the cooperative execution device main unit 20 and transmits the parameter to the wholesale service provider API execution unit 130. Further, the API calling logic unit 120 receives an execution result of the wholesale service provider API 50 from the wholesale service provider API execution unit 130 and converts the execution result into an appropriate data format distributable to the cooperative execution device main unit 20. A process of the API calling logic unit 120 will be described below with reference to FIG. 7.

The API calling logic unit 120 describes an API calling logic (for example, a sequence of API calling execution, and input and output parameter designation).

The API calling logic unit 120 is manually implemented based on a template source code converted to a common library and the automatically generated IF specification document.

Wholesale Service Provider API Execution Unit 130

The wholesale service provider API execution unit 130 receives data necessary for execution of the wholesale service provider API (a data format in this case is referred to as an "object") from the API calling logic unit 120. The wholesale service provider API execution unit 130 reassembles the data in the form of a HTTP request and transmits the resultant data to the wholesale service provider 2.

After the wholesale service provider API execution unit 130 receives an HTTP response from the wholesale service provider 2, the wholesale service provider API execution unit 130 performs status code checking and an exception issuing process, and acquisition of a response header and body, and reassembles the data in an appropriate format, and returns the resultant data to the API calling logic unit 120. A process of the wholesale service provider API execution unit 130 will be described below with reference to FIG. 8.

The wholesale service provider API execution unit 130 creates and transmits an HTTP request corresponding to individual wholesale service provider APIs, receives a response, extracts a value from the response, and performs an exception process (which will be described with reference to FIG. 8).

When stating in relation to Non-Patent Literature 2, the wholesale service provider API execution unit 130, as an individual service API wrapper function, performs an individual service API call instead and provides functions in units easy to use for logic description. The wholesale service provider API execution unit 130 assembles and transmits an HTTP request and receives a response as an individual service API transmission and reception function. For an individual service API wrapper, it is assumed that standardization of Open API Spec proceeds, and an API specification of each individual service is published in an Open API Spec format, and automatic generation of functional units can be performed through application of Swagger Codegen (to be described below with reference to FIG. 10), which is a corresponding IF unit automatic generation tool.

Single Order 31

Figure 4:
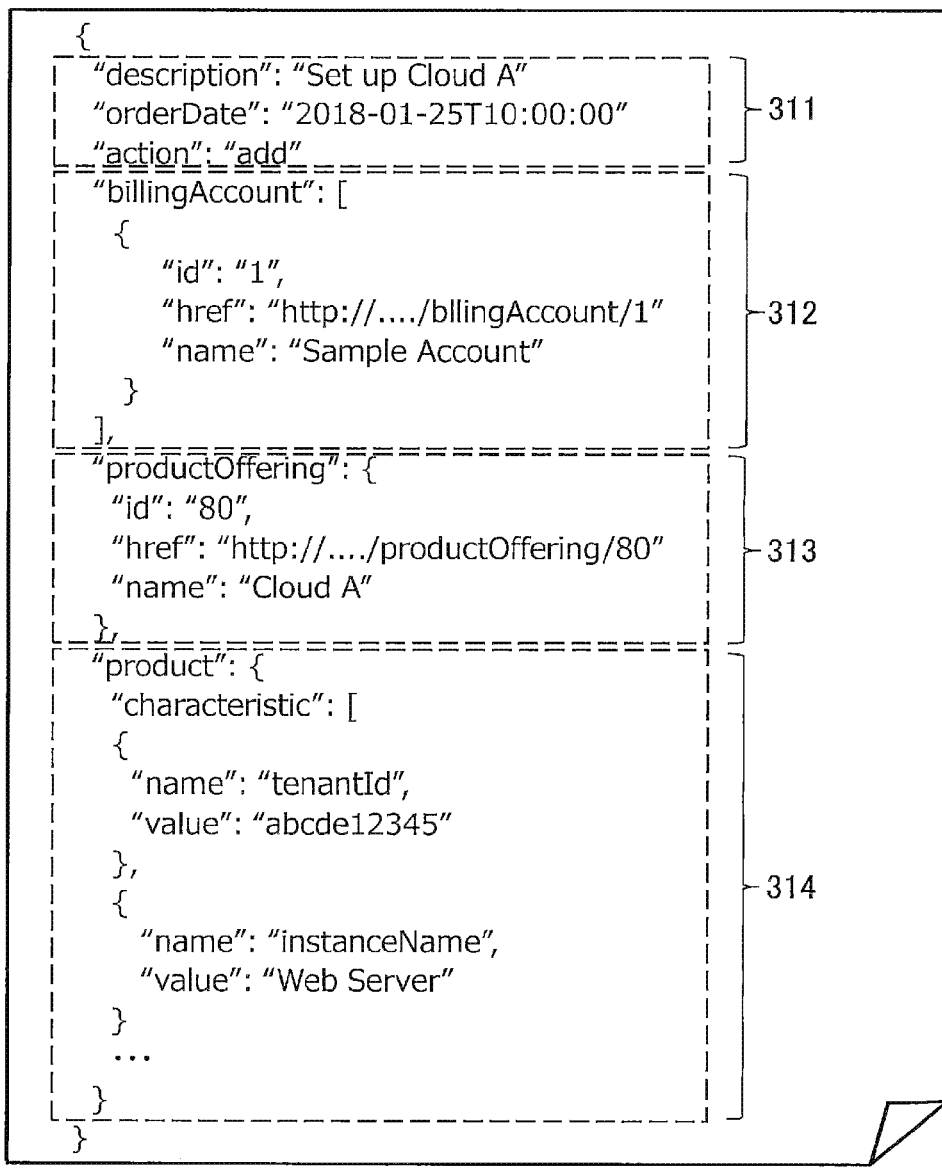
FIG. 4 is a diagram illustrating an example of a single order of the API adapter according to the embodiment of the present invention.

FIG. 4 is a diagram illustrating an example of the single order 31, and is an example of a case in which the single order 31 conforms to a TMF API. The single order 31 need not necessarily be in this descriptive format.

The single order 31 illustrated in FIG. 4 describes order general information 311 (order description, order date and time, and order type)

"description": "Set up Cloud A"
"orderDate": "2018-01-25T10:00:00"
"action": "add".

Further, the single order 31 describes designation of billing account 312

```
"billingAccount ": [
    {
        "id": "1",
        "href": "http://..../bllingAccount/1"
        "name": "Sample Account"
    }
].
```

The single order 31 describes designation of a catalog for use (Service Menu) 313

```
"productOffering":{
    "id": "80",
    "href": "http://..../ productOffering/80"
    "name": "Cloud A"
}.
```

Further, the single order 31 describes designation of order parameters (Order-Specific Parameters) 314

```
"product":{
    "characteristic": [
        {
            "name": "tenantId",
            "value": "abcde12345"
        },
        {
            "name ": "instanceName",
            "value": "Web Server"
        }
        ...
}.
```

Designation of these order parameters depends on the order. In this example, a tenant ID, an instance name, and the like of the cloud are designated.

Hereinafter, an operation of the API adapter unit 100 configured as described above will be described.

Process of Order Reception Unit 110

First, a process of the order reception unit 110 will be described.

Figure 5:
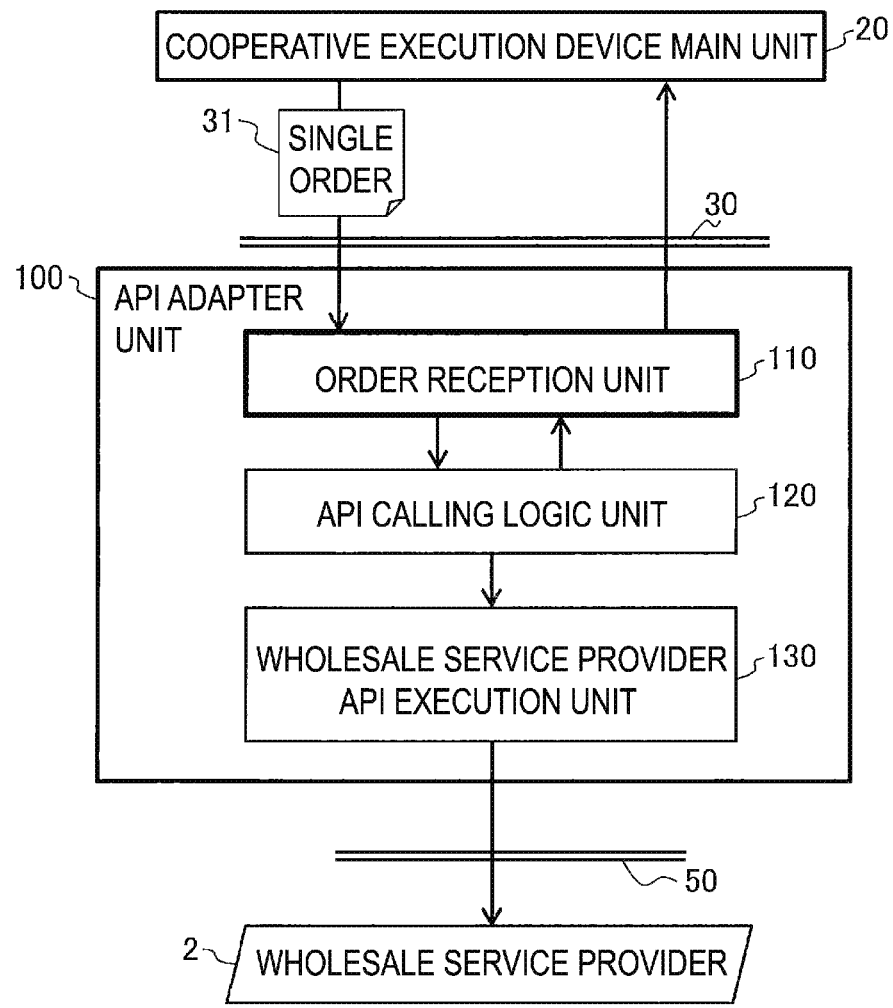
FIG. 5 is a diagram illustrating a process of an order reception unit of the API adapter according to the embodiment of the present invention.

FIG. 5 is a diagram illustrating a process of the order reception unit 110.

The order reception unit 110 executes an order reception/response process, and an order content acquisition process.

Data Reception/Response Process

The order reception unit 110 performs state management and notification from the reception of the single order 31 to completion of execution of the single order 31, and distribution of execution results according to a procedure that is determined in advance with respect to the cooperative execution device main unit 20.

A sequence with respect to the cooperative execution device main unit 20 may vary depending on the cooperative execution device 10 (see FIG. 1), but may be common to respective cooperative execution devices 10.

Examples of an order reception/response process are described.

When the order reception unit 110 has received the single order 31, the order reception unit 110 first sets state="acknowledged", outputs a notification to the cooperative execution device main unit 20, and calls the API calling logic unit 120 to cause it to start calling logic execution. The API calling logic unit 120 requests the order reception unit 110 to acquire content of the single order 31 while performing logic execution. The order reception unit 110 sends necessary information to the API calling logic unit 120 in response to the request of the API calling logic unit 120.

When the logic execution in the API calling logic unit 120 has been started, the order reception unit 110 sets state="InProgress" and outputs a notification to the cooperative execution device main unit 20. In the embodiment, it is regarded that logic execution at the API calling logic unit 120 is started when the order reception unit 110 makes a call to the API calling logic unit 120. The order reception unit 110 may receive a logic execution start notification from the API calling logic unit 120.

The order reception unit 110 returns a response of the wholesale service provider API 50 to the cooperative execution device main unit 20. More specifically, the order reception unit 110 inputs a value returned from the wholesale service provider API 50 to an object named a product, and returns the object to which the value has been input, to the cooperative execution device main unit 20.

When logic processing in the API calling logic unit 120 successfully ends, the order reception unit 110 notifies the cooperative execution device main unit 20 of state="completed" (order state completion).

The order reception/response process is dependent of implementation, and other aspects are possible.

Order Content Acquisition Process

The order reception unit 110 receives a request of the API calling logic unit 120 and acquires detailed order content (catalog/order parameter).

A catalog/order parameter description method may vary depending on the cooperative execution devices 10 (see FIG. 1), but can be common to the respective cooperative execution devices 10.

An example of an order content acquisition process will be described.

The order reception unit 110 receives the request of the API calling logic unit 120 and acquires the order content.

The order reception unit 110 executes a catalog acquisition process. A catalog acquisition process will be described. A reference destination such as: "http:// . . . /productOffering/80" may be described in "Designation of catalog to use", as in the "designation of a catalog for use (Service Menu)" in the specific example of the single order 31 illustrated in FIG. 4. In this case, data is acquired from the reference destination, and the data (value) acquired from the reference destination is returned to the API calling logic unit 120. Incidentally, in the TMF format, the reference destination is designated in the "designation of catalog to use" and an order parameter is directly described in the "designation of order parameter" of the single order 31 illustrated in FIG. 4.

The order reception unit 110 executes an order parameter acquisition process.

Incidentally, the catalog is independent of the order, whereas the order parameter is on each order. Therefore, it is believed that the same catalog/order parameter will be described even when TMF format is not used.

The order reception unit 110 basically does not depend on individual adapters. Thus, the source code can be created in advance, and is provided in the form of a source code of the common library (for example, a common library source code 106 in FIG. 13).

Common Library

Next, a common library will be described with reference to FIG. 6.

Figure 6:
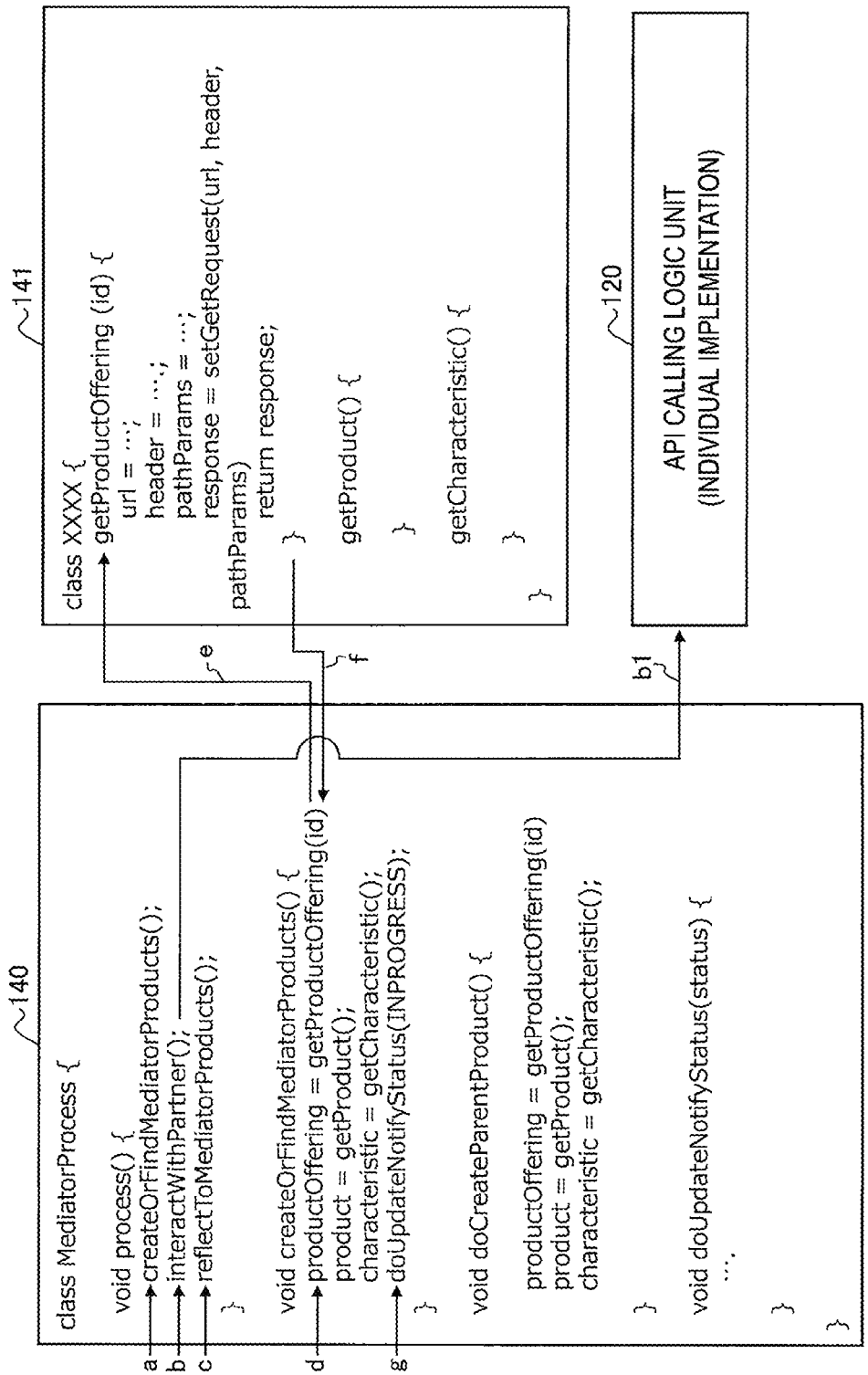
FIG. 6 is a diagram illustrating a common library of the API adapter according to the embodiment of the present invention.

FIG. 6 is a diagram illustrating a common library, is a diagram illustrating an example of the common library 140, and is a diagram illustrating a calling destination 141 of "order content acquisition" of the common library 140.

Main processes of the common library 140 are reference signs a, b, and c in FIG. 6, which describe createOrFindMediatorProducts ( ), which is pre-processing;

interactWithPartner ( ), which is a main process; and reflectToMediatorProducts ( ), which is post-processing.

Among these, the pre-processing "createOrFindMediatorProducts ( );" and post-processing "reflectToMediatorProducts ( );" are common processing, and actual processing is described in the common library.

As actual processing of createOrFindMediatorProducts ( ) indicated by reference sign a in FIG. 6, an "order content acquisition" process indicated by reference sign d in FIG. 6, a process of "notifying of state change (InProgress)" indicated by reference sign g in FIG. 6, or the like is described.

The main process "interactWithPartner ( );" indicated by reference sign b in FIG. 6 is a portion in which an individual process of executing an API is performed for each wholesale service and this main process cannot be made common in the common library. Thus the main process is described in "individual implementations" of the API calling logic unit 120 indicated by reference sign b1 in FIG. 6.

ReflectToMediatorProducts ( ) indicated by reference sign c in FIG. 6 is a process for "returning a response of the wholesale service provider API to the cooperative execution device main unit 20", and actual processing is implemented within the common library (not illustrated in FIG. 6).

In the "order content acquisition" process indicated by reference sign d in FIG. 6, productOffering=getProductOffering (id) is described. Thus, "details of the order content acquisition process" indicated by reference sign e in FIG. 6 is called, and then, "order content acquisition" indicated by reference sign d in FIG. 6 is returned, as indicated by reference sign f in FIG. 6.

A descriptive image of details of the order content acquisition process is as follows. When a ProductOffering (catalog) acquisition process is called, the following getProductOffering is executed:

```
class XXXX {
    getProductOffering (id) {
        url = ...;
        header = ....;
        pathParams = ...;
        response = setGetRequest (url, header, pathParams) return
        response;
    }
    getProduct ( ) {
    }
    getCharacteristic ( ) {
    }
}
```

In doUpdateNotifyStatus (INPROGRESS); indicated by reference sign g in FIG. 6, the process of "notifying of state change (InProgress)" is executed. An actual process is implemented within the common library (omitted in FIG. 6).

Process of API Calling Logic Unit 120

Next, a process of the API calling logic unit 120 will be described.

Figure 7:
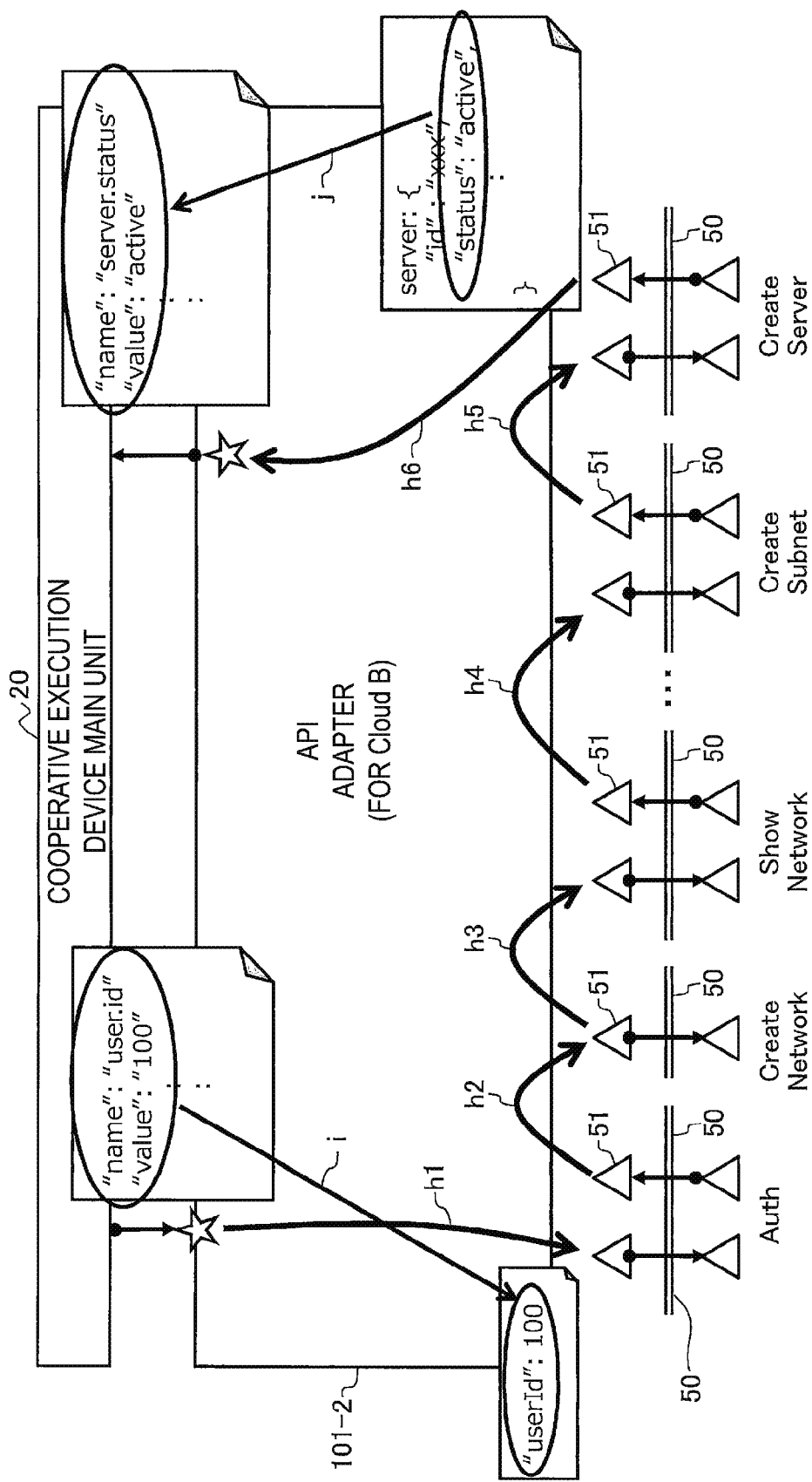
FIG. 7 is a diagram illustrating a process of an API calling logic unit of the API adapter according to the embodiment of the present invention.

FIG. 7 is a diagram illustrating a process of the API calling logic unit 120. However, in FIG. 7, the API calling logic unit 120 is not indicated and an API sequence control and a parameter refilling process are shown. A star symbol in FIG. 7 indicates that an API format is converted between the cooperative execution device main unit 20 and the API adapter 101, and a triangle symbol in FIG. 7 indicates that an API format is not converted between the wholesale service provider APIs.

For the API adapter 101, the API adapter 101-2 for the cloud 21-2 is used as an example. Further, it is assumed that the API executed by the wholesale service provider 2 is Auth (Authorization (authentication) token acquisition), Create Network, Show Network, Create Subnet, and Create Server.

The API calling logic unit 120 (not illustrated in FIG. 7) executes an API sequence control and a parameter refilling process.

API Sequence Control: 1

The API calling logic unit 120 checks an activation condition of the wholesale service provider API 50 and activates the wholesale service provider API 50 in a determined sequence of execution, as indicated by reference signs h1 to h6 in FIG. 7. The activation condition is as follows. A condition may be set for activation. For example, an API is executed on condition that a certain parameter is set to true in some cases. The API calling logic unit 120 checks the presence or absence of such activation condition, and activates the wholesale service provider API 50 when the activation condition is satisfied. The sequence of execution is defined in a design stage.

In FIG. 7, when the API calling logic unit 120 (not illustrated in FIG. 7) receives the single order from the cooperative execution device main unit 20 (see a star symbol in FIG. 7), the API calling logic unit 120 first activates the wholesale service provider API 50 (here, the API 50 of an Auth (authentication) token) according to the determined sequence of execution (see reference sign h1 in FIG. 7).

Parameter Refilling Process: 2

The API calling logic unit 120 (not illustrated in FIG. 7) extracts a parameter necessary for execution of the wholesale service provider API 50 (here, the wholesale service provider API 50 of Auth) from within the order from the cooperative execution device main unit 20, and transmits the parameter to the wholesale service provider API execution unit 130 (not illustrated in FIG. 7). Here, it is assumed that for the parameter necessary for execution of the wholesale service provider API 50, a method of setting a value thereof is determined in a design stage of the API adapter. For example, it is determined whether the value to be used is a predetermined value, a value read from an order of the service provider, or a value read from a configuration file. Further, for a parameter "read from the order of the service provider", a data configuration in the order and a parameter name are determined. Examples includes "name": "user.id" and "value": "100".

The API calling logic unit 120 (not illustrated in FIG. 7) refills parameters extracted from the order "name": "userid" and "value": "100"

with "userId": 100, as indicated by reference sign i in FIG. 7.

That is, the parameters extracted from the order includes a parameter name "name" having a value "user.id", and a parameter name "value" having a value "100," as indicated by reference sign i in FIG. 7. On the other hand, when the wholesale service provider API 50 is executed, it is necessary to perform conversion to a format in which the parameter name is "userId" and the value is "100", like "userId": 100." The API calling logic unit 120 (not illustrated in FIG. 7) performs such a parameter refilling (conversion) process for conversion into an appropriate data format.

API Sequence Control: 2

When the process of the API 50 of Auth regarding the Auth (authentication) token ends, the wholesale service provider API 50 of the next wholesale service provider API 50 (here, Create Network) is activated according to the determined sequence of execution under the API sequence control (see reference sign h2 in FIG. 7).

Then, the next wholesale service provider API 50 (here, the wholesale service provider API 50 of Show Network) is activated according to the determined sequence of execution by the API sequence control (see reference sign h3 in FIG. 7). Then, the same process is repeated by API sequence control until the wholesale service provider API 50 of Create Server is activated (see reference sign h5 in FIG. 7).

In general, as illustrated in FIG. 7, an Auth (authentication) API is executed, a wholesale service provider API 50 of Create Network is activated for network construction (see reference sign h3 in FIG. 7), and further, a wholesale service provider API 50 of Create Subnet is activated for generation of a subnet in the network (see reference sign h4 in FIG. 7) (that is, Show Network is activated for confirmation of a result of Create Network), then a wholesale service provider API 50 of Create Server that creates a server in the subnet is activated (see reference sign h5 in FIG. 7) according to an sequence of execution.

When the API adapter 101-2 for the cloud 21-2 is an adapter that creates a server in the subnet, the process ends with the completion of the server creation.

In FIG. 7, the wholesale service provider API 50 of Show Network is activated between the activation of the wholesale service provider API 50 of Create Network and the activation of the wholesale service provider API 50 of Create Subnet. The reason for the activation of the wholesale service provider API 50 of Show Network is as follows.

The wholesale service provider API 50 of Create Network is an asynchronous API. Thus, even when the response is returned from the wholesale service provider API 50 of Create Network, it takes time to actually complete the network. Therefore, the wholesale service provider API 50 of Show Network is placed in the next sequence of execution of the wholesale service provider API 50 of Create Network, thereby confirming that the network has been completed by the wholesale service provider API 50 of Create Network.

Parameter Refilling Process: 2

In execution of the last wholesale service provider API 50 (here, the wholesale service provider API 50 of Create Network) according to the determined sequence of execution under the API sequence control, the parameter refilling process is performed.

The API calling logic unit 120 (not illustrated in FIG. 7) receives an execution result of the wholesale service provider API (wholesale service provider API 50 of Create Network) from the wholesale service provider API execution unit 130 (not illustrated in FIG. 7) and converts the execution result to an appropriate data format distributable to the cooperative execution device main unit 20.

The API calling logic unit 120 (not illustrated in FIG. 7) refills parameters of the wholesale service provider API 50 of Create Network Server:

```
{
    "id": "xxx",
    "status": "active",
    (omitted)
}
``` with "name": "server.status"
"value": "active", as indicated by reference sign j in FIG. 7.

That is, when a value of the parameter name "status" has returned as "active", for example, as an execution result of the wholesale service provider API 50 of Create Server, a parameter refilling (conversion) process is performed to refill a value of the parameter name "name" as "server.status" and a value of the parameter name "value" as "active", as indicated by reference sign j in FIG. 7.

API Sequence Control: 3

As indicated at h6 of FIG. 7, in this example, the API calling logic unit 120 (not illustrated in FIG. 7) distributes data obtained by performing the parameter refilling process on an execution result of the wholesale service provider API 50 of the last Create Network according to the determined sequence of execution to the cooperative execution device main unit 20 (see a star symbol in FIG. 7). In this example (FIG. 7), only a result of the last API is distributed, but the distribution is not necessarily limited to the result of the last API.

Process of Wholesale Service Provider API Execution Unit 130

Next, a process of the wholesale service provider API execution unit 130 will be described. FIG. 8 is a diagram illustrating a process of the wholesale service provider API execution unit 130.

As described above, the order reception unit 110 performs reception/response process of the single order from the cooperative execution device main unit 20 (not shown). The order reception unit 110 performs acquisition of the order content. The API calling logic unit 120 describes an API calling logic (for example, sequence of execution, and input and output parameter specification).

Figure 8:
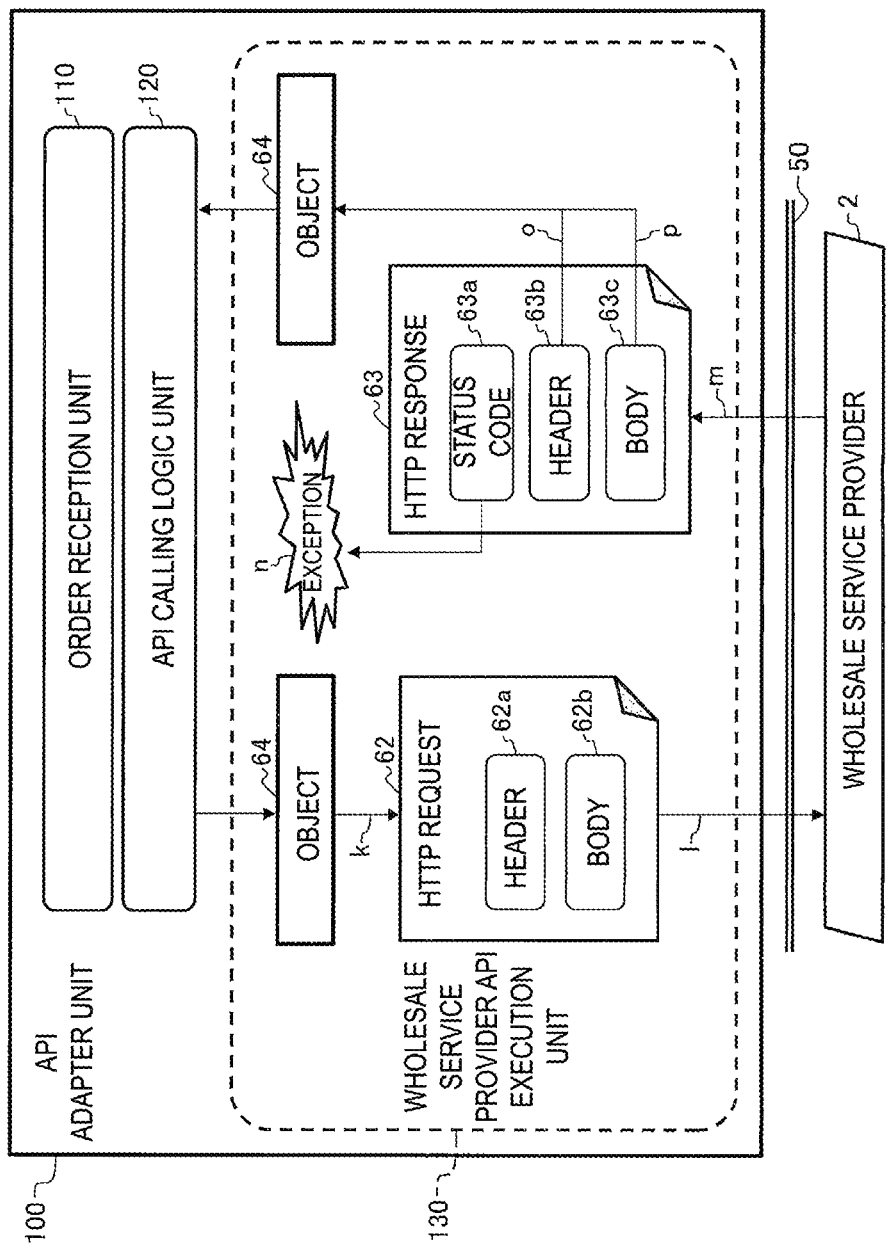
FIG. 8 is a diagram illustrating a process of a wholesale service provider API execution unit of the API adapter according to the embodiment of the present invention.

As illustrated in FIG. 8, the wholesale service provider API execution unit 130 receives data (object 64) necessary for execution of the wholesale service provider API from the API calling logic unit 120.

The wholesale service provider API execution unit 130 reassembles the object 64 into the form of a HTTP request 62, as indicated by a reference sign k in FIG. 8. The HTTP request 62 includes a header 62a and a body 62b.

The wholesale service provider API execution unit 130 transmits the HTTP request 62 to the wholesale service provider 2, as indicated by reference sign l in FIG. 8.

As indicated in a reference sign m in FIG. 8, the wholesale service provider API execution unit 130 receives the HTTP response 63 from the wholesale service provider 2. The HTTP response 63 includes a status code 63a, a header 63b, and a body 63c.

The wholesale service provider API execution unit 130 performs status code check and an exception issuing process (a process of issuing an "exception"), as indicated by reference sign n in FIG. 8.

The wholesale service provider API execution unit 130 performs check of the status code because a normal response may not be returned even when the HTTP request 62 is transmitted to the wholesale service provider 2. For example, the wholesale service provider API execution unit 130 receives a "status code indicating that generation of Create Network is successful" or a "status code (error code) indicating that generation of Create Network has failed" from the wholesale service provider 2.

In the exception issuing process, when an exceptional situation occurs, a code indicating a type of exception that has occurred, is output to the outside (the outside of the wholesale service provider API execution unit 130). Further, processing of the exception that has occurred is prepared as a library in advance at the outside, and a functional unit (software) that receives the exception (code) executes an exception process. In the embodiment, the wholesale service provider API execution unit 130 ends the process by performing exception issuing.

The wholesale service provider API execution unit 130 acquires a response header (for example, a token), as indicated by a reference sign o in FIG. 8.

The wholesale service provider API execution unit 130 performs reassembly into an appropriate format (for example, an http format as an object format) based on the response header and the body, to create the object 64, as indicated by a reference sign p in FIG. 8. The wholesale service provider API execution unit 130 returns the object 64 to the API calling logic unit 120.

Automatic Generation Based on API Specification Document

Figure 9:
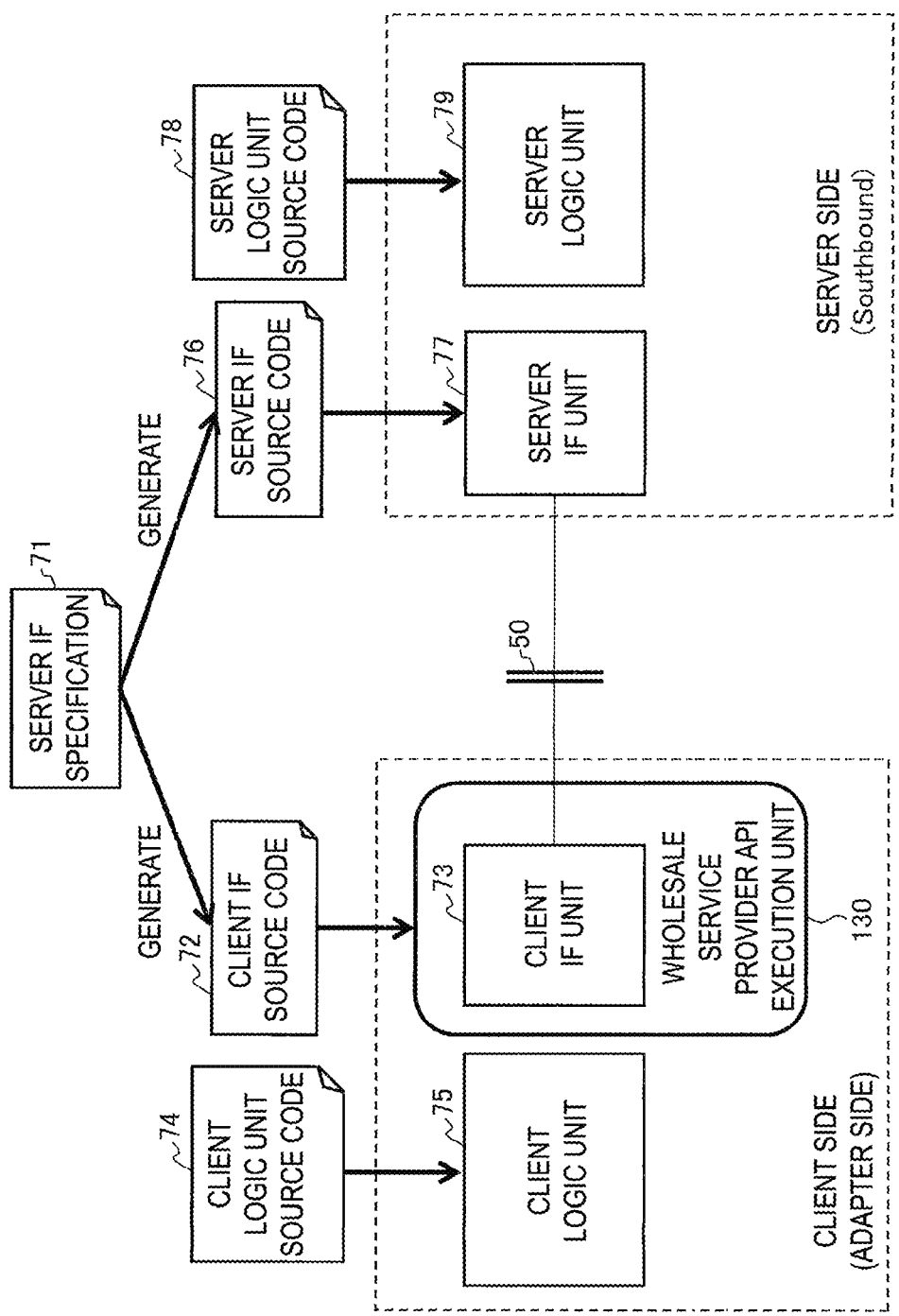
FIG. 9 is a diagram illustrating automatic generation based on an API specification document of the API adapter according to the embodiment of the present invention.

Next, automatic generation based on the API specification document will be described. FIG. 9 is a diagram illustrating the automatic generation based on the API specification document.

In the standardization group Open API Initiative, Google, Microsoft, or the like play a central role and aim to standardize a method of describing a machine-readable web API specification document.

The web API specification document is machine-readable, allowing a software development kit (SDK) unit on the client side (adapter side) and a server mock on the server side (wholesale service side) to be automatically generated. Swagger Codegen (to be described below), which is an open-source software (OSS) supporting this technology, is applied to the creation of the API adapter of the embodiment, thereby automatically generating the wholesale service provider API execution unit 130. Swagger Codegen is only an example, and is applicable to any technology as long as the technology is the same automatic generation technology based on a server-side API specification.

As illustrated in FIG. 9, a server IF specification 71 is prepared. The server IF specification 71 is, for example, an Open API specification/Swagger specification (hereinafter, Swagger Spec), and corresponds to WSDL in a web service (an XML notation for describing the web service).

A client IF source code 72 is generated by applying Swagger Codegen from the server IF specification 71. The Swagger Codegen corresponds to WSDL2Java. Further, the generated client IF source code 72 corresponds to a client SDK (a stub in the web service).

A client IF unit 73 is created from the client IF source code 72 and implemented in the wholesale service provider API execution unit 130.

A client logic unit source code 74 is prepared. A client logic unit 75 is created based on the client logic unit source code 74.

The client logic unit 75 and the wholesale service provider API execution unit 130 are combined so that the client side (adapter side) is completed.

On the other hand, the server side is developed by each wholesale provider and the API 50 is published. In the embodiment, in particular, Swagger Codegen is not used, but on the server side, a server IF source code 76 is generated from the server IF specification 71, for example.

This server IF source code 76 corresponds to a mock server (skeleton in a web service). A server IF unit 77 is created from the server IF source code 76.

A server logic unit source code 78 is prepared. A server logic unit 79 is created based on the server logic unit source code 78.

The server logic unit 79 and a server IF unit 77 are combined so that a server side (Southbound) is completed.

The wholesale service provider API execution unit 130 on the client side (adapter side) and the server side (Southbound) perform HTTP request transmissions and response reception corresponding to the individual wholesale service provider API 50 through the wholesale service provider API 50.

Swagger Codegen

Next, Swagger Codegen will be described.

Figure 10:
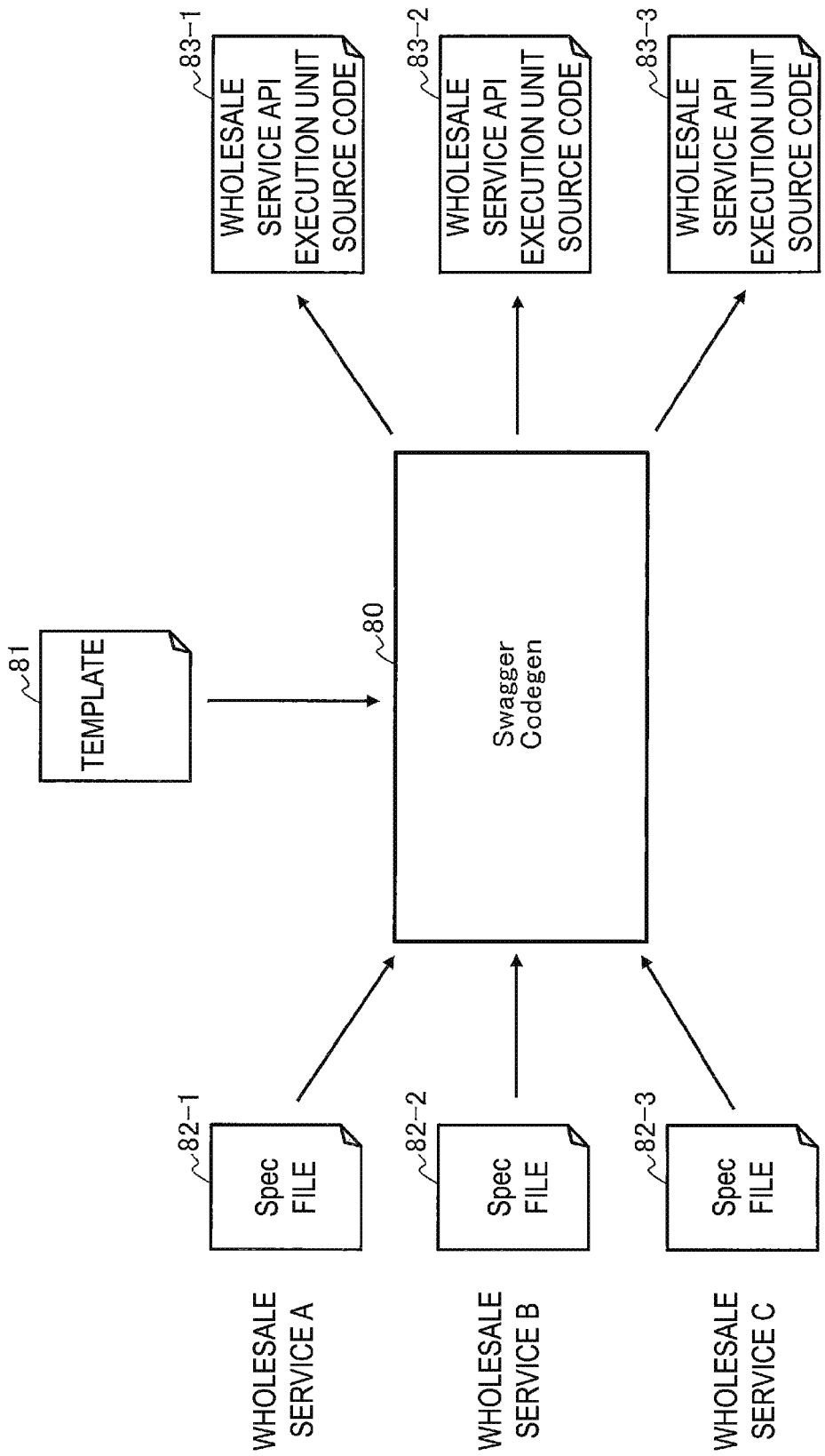
FIG. 10 is a diagram illustrating Swagger Codegen of the API adapter according to the embodiment of the present invention.

FIG. 10 is a diagram illustrating Swagger Codegen.

A Swagger Codegen 80 is a command line tool that generates a client/server code from an API specification described in Swagger Spec. The Swagger Codegen 80 automatically generates a driver or client SDK from the API specification described in Swagger Spec (a document conforming to a specification of Swagger with respect to REST API).

A template 81 defining a conversion rule for automatic code generation and Spec files 82-1, Spec files 82-2, and Spec files 82-3, which are files necessary for a build defining an API specification of each wholesale service are input to the Swagger Codegen 80. The Spec file 82-1 is a Spec file for wholesale service A, the Spec file 82-2 is a Spec file for wholesale service B, and the Spec file 82-3 is a Spec file for wholesale service C.

The Swagger Codegen 80 inputs Spec files (Spec file A 82-1, Spec file B 82-2, and Spec file C 82-3) defining the respective wholesale service provider API specifications, and automatically generates a wholesale service API execution unit source code for each of the wholesale services by referring to the template 81. The wholesale service API execution unit source codes, which are automatic generation targets, includes a wholesale service API execution unit source code 83-1, a wholesale service API execution unit source code 83-2, and a wholesale service API execution unit source code 83-3.

Hereinafter, a method of creating the API adapter unit 100 configured as described above will be described.

The embodiment is characterized by the method of creating the API adapter unit 100.

The API adapter creation method of the embodiment includes combining the order reception unit 110, the API calling logic unit 120, and the wholesale service provider API execution unit 130 to create the API adapter unit 100 (see FIG. 3).

Specifically, the API adapter creation method includes:

A method of using the order reception unit 110 converted to a common library A method of implementing the API calling logic unit 120 based on the template source code converted to a common library and the automatically generated IF specification document A method of using the automatically generated wholesale service provider API execution unit 130.

Each of the above methods is implemented by (1) a wholesale service provider API execution unit generation process, (2) a common library and wholesale service provider API execution unit incorporation process, and (3) an API calling logic unit creation process.

An example of the common library is described with reference to FIG. 6.

Overview of API Adapter Creation Method

Figure 11:
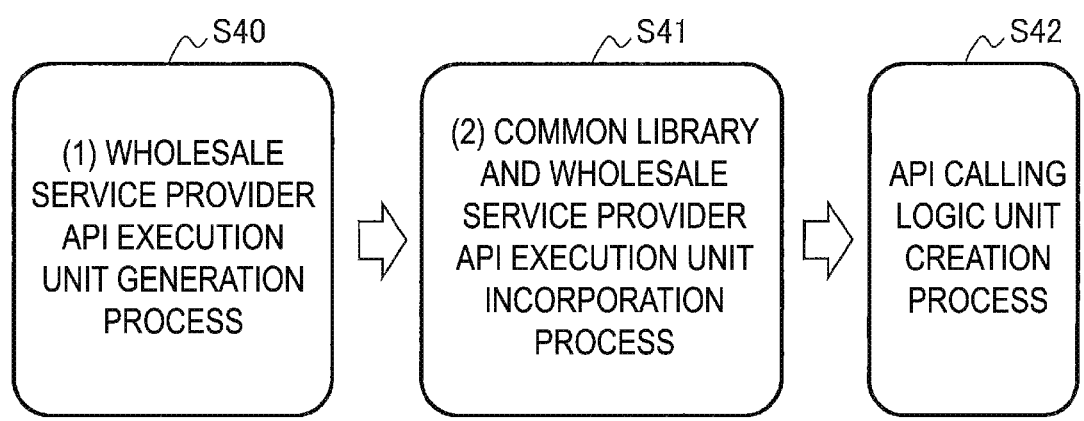
FIG. 11 is a diagram schematically illustrating an API adapter creation method for an API adapter according to an embodiment of the present invention.

FIG. 11 is a diagram schematically illustrating an API adapter creation method. FIG. 11 shows respective processes of the API adapter creation method.

As illustrated in FIG. 11, the API adapter creation method includes the following processes (1) to (3).

(1) Wholesale Service Provider API Execution Unit Generation Process

In a wholesale service provider API execution unit generation process S40, a wholesale service provider API execution unit source code is automatically generated based on a wholesale service provider API specification document. Swagger Codegen in FIG. 10 is used for automatic generation of the wholesale service API execution unit source code. Swagger Codegen is an example, and the present invention is not limited thereto as long as technologies are the same. In the wholesale service provider API execution unit generation process, a wholesale service provider API execution unit specification document is generated from the automatically generated source code.

(2) Common Library and Wholesale Service Provider API Execution Unit Incorporation Process In a common library and wholesale service provider API execution unit incorporation process S41, the common library source code and the generated wholesale service provider API execution unit source code are incorporated into an API calling logic unit template source code.

(3) API Calling Logic Unit Creation Process

In an API calling logic unit creation process S42, an adapter unit source code is manually implemented based on a template source code in which the common library and the wholesale service API execution unit source code have been incorporated, and various manual and specification documents. The created source code is built so that an adapter unit execution file is obtained.

Hereinafter, the wholesale service provider API execution unit generation process, the common library and wholesale service provider API execution unit incorporation process, and the API calling logic unit creation process will be described in this order.

Wholesale Service Provider API Execution Unit Generation Process

Figure 12:
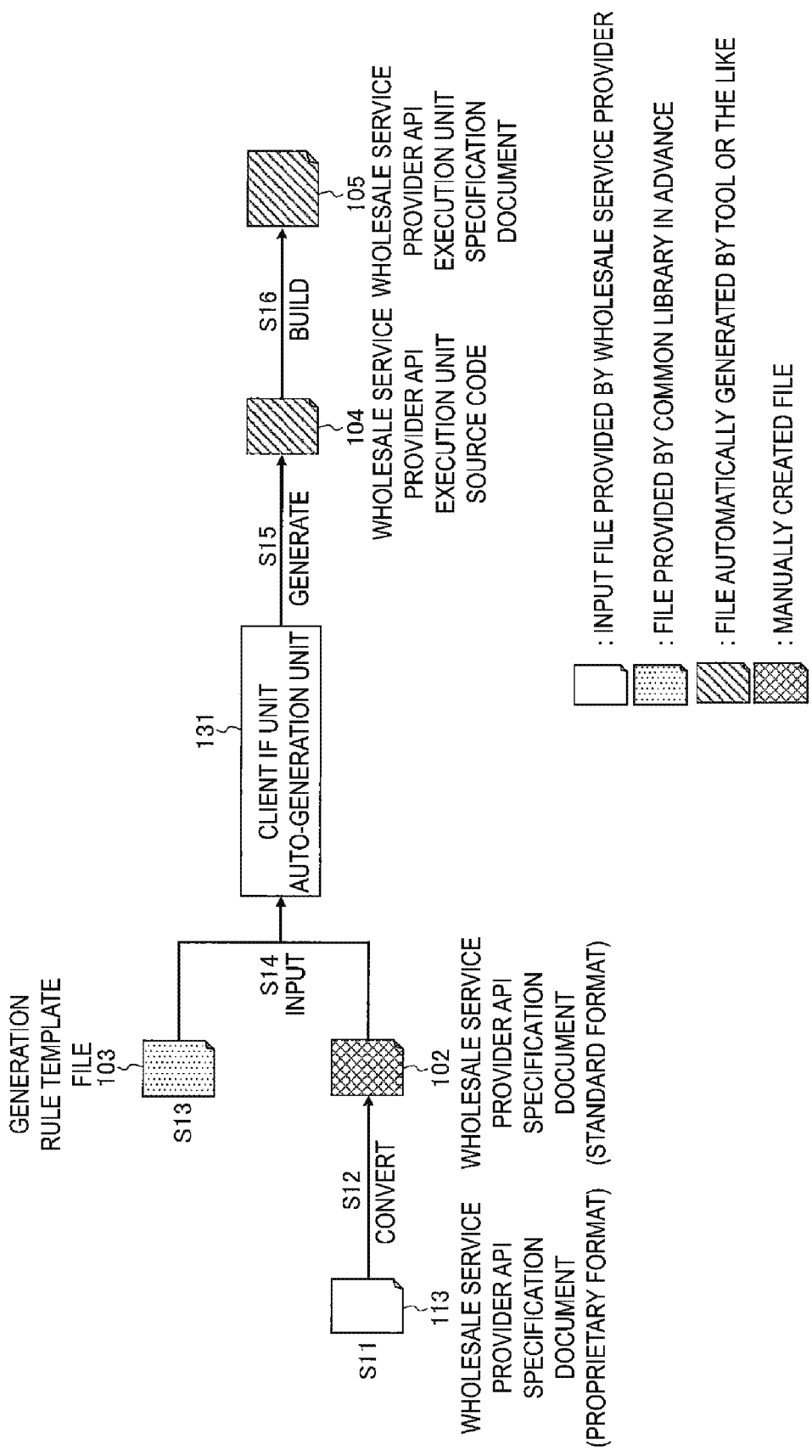
FIG. 12 is a process diagram illustrating a wholesale service provider API execution unit generation process of the API execution unit according to an embodiment of the present invention.

FIG. 12 is a process diagram illustrating the wholesale service provider API execution unit generation process S40. A white file in FIG. 12 indicates an input file that is provided by the wholesale service provider, a shaded files in FIG. 12 indicates a file that is provided by the common library in advance, a hatched file in FIG. 12 indicates a file that is automatically generated by a tool or the like, and a grid file in FIG. 12 indicates a manually created file (hereinafter, the file is indicated by the same notation), respectively.

In step S11, the wholesale service provider 2 (see FIG. 1) provides an API specification document (proprietary format) 113.

In step S12, the API specification document (proprietary format) 113 provided by the wholesale service provider 2 is corrected (converted) to a standard format of wholesale service provider API specification document (standard format) 102. When the standard format of API specification document is provided by the wholesale service provider 2, this step S12 is not required.

The API specification document 102 of the wholesale service provider 2 is a file in which an API endpoint, a method, an input and output parameter list, and the like are described. An Open API Specification format, and the like are assumed, but the present invention is not limited thereto.

In step S13, a generation rule template file 103 (see the template 81 in FIG. 10) is provided by the common library (see FIG. 6).

A rule for automatically generating the wholesale service provider API execution unit source code from the standard format of API specification document is described in the generation rule template file 103 Further, an exception issuing process according to the status code in the HTTP response (see an exception issuing process indicated by reference sign n in FIG. 8) and a process of acquiring a header value from a response (see a process of acquiring a response header indicated by reference sign o in FIG. 8) is set as a rule in the generation rule template file 103. A client IF unit auto-generation unit 131 (to be described below) is an automatic generation tool itself, for example, swagger codegen.

In step S14, the wholesale service provider API specification document (standard format) 102 and the generation rule template file 103 are input to the client IF unit auto-generation unit 131.

In step S15, the client IF unit auto-generation unit 131 generates the wholesale service provider API execution unit source code 104 (corresponding to the client IF source code 72 in FIG. 9) based on the wholesale service provider API specification document (standard format) 102 and the generation rule template file 103. The client IF unit auto-generation unit 131 is a functional unit that automatically generates the wholesale service provider API execution unit source code 104 based on the standard format of API specification and is, specifically, a client IF unit auto-generation tool. The client IF unit auto-generation tool is assumed as Swagger Codegen (see FIG. 10) or the like, but the present invention is not limited thereto.

In step S16, the generated wholesale service provider API execution unit source code 104 is built (compiled) so that a wholesale service provider API execution unit specification document 105 is generated.

The wholesale service provider API execution unit source code 104 is built so that the wholesale service provider API execution unit specification document and the wholesale service provider API execution unit (client IF unit 73) are generated. However, in the API adapter creation procedure in the embodiment, the client IF unit 73 is not used (not shown) because those are built together later.

Figure 13:
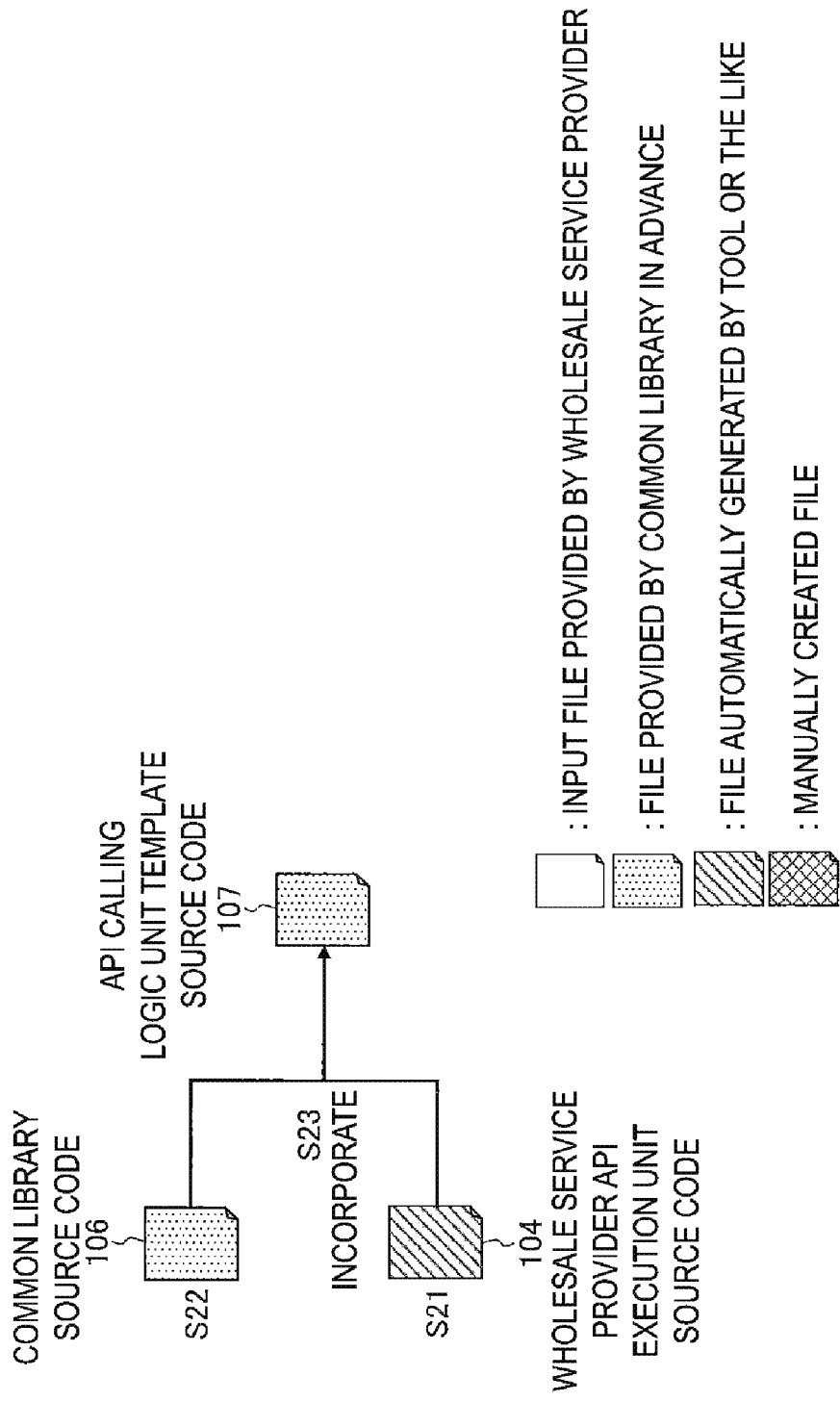
FIG. 13 is a process diagram illustrating a common library and wholesale service provider API execution unit incorporation process of the API adapter according to embodiments of the present invention.

Common Library and Wholesale Service Provider API Execution Unit Incorporation Process FIG. 13 is a process diagram illustrating a common library and wholesale service provider API execution unit incorporation process.

In step S21, the wholesale service provider API execution unit source code 104 generated in step S15 of the wholesale service provider API execution unit generation process (see FIG. 12) is input.

In step S22, a common library source code 106 is provided by a common library (see FIG. 6). The common library source code 106 is a source code converted to a common library. The common library source code 106 includes order reception and response, and order content acquisition functions from the cooperative execution device main unit 20 (see FIG. 3).

In step S23, the common library source code 106 and the wholesale service provider API execution unit source code 104 generated in the wholesale service provider API execution unit generation process (see FIG. 12) are incorporated into the API calling logic unit template source code 107. The API calling logic unit template source code 107 is a template source code of the API calling logic unit, which has been converted to a common library. The API calling logic unit template source code 107 includes a routine descriptive portion other than a parameter correspondence relationship, a sequence of API execution, or the like.

API Calling Logic Unit Creation Process

Figure 14:
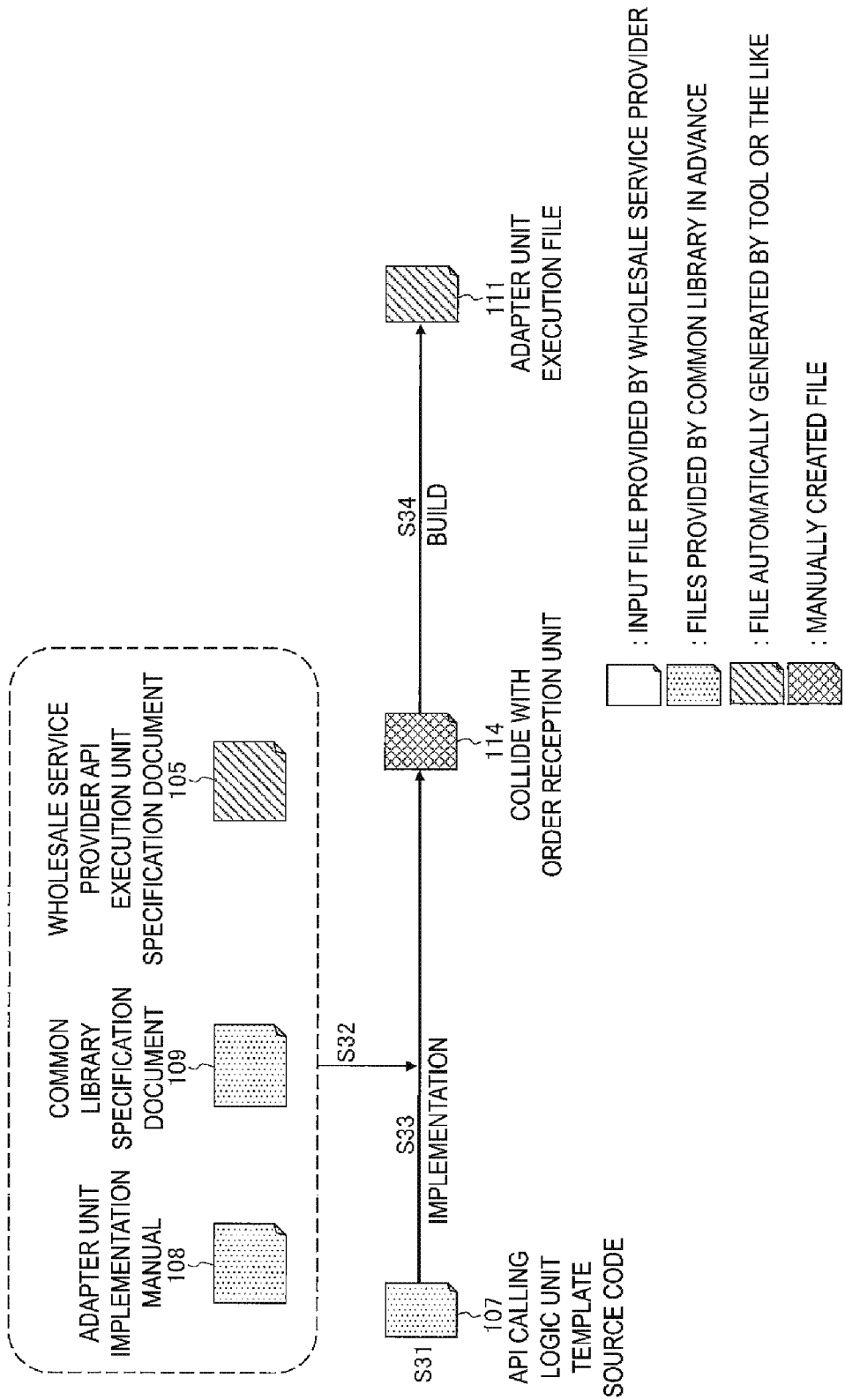
FIG. 14 is a process diagram illustrating an API calling logic unit creation process of the API adapter according to the embodiment of the present invention.

FIG. 14 is a process diagram illustrating an API calling logic unit creation process.

In step S31, the API calling logic unit template source code 107 generated in step S23 of the common library and wholesale service provider API execution unit incorporation process (see FIG. 12) is input.

In step S32, an adapter unit implementation manual 108 and a common library specification document 109, which are files provided in advance by the common library (see FIG. 6), and the wholesale service provider API execution unit specification document 105, which is a file automatically generated by a tool or the like, can be referred to.

In step S33, the API calling logic unit 120 (see FIG. 3) is implemented by manually changing the API calling logic unit template source code 107 while referring to the adapter unit implementation manual 108, the common library specification document 109, and the wholesale service provider API execution unit specification document 105. That is, in step S33, an adapter unit source code 114 is manually implemented based on the template source code in which the common library and the wholesale service API execution unit source code have been incorporated, and various manual and specification documents.

In step S34, the created adapter unit source code is built (compiled) so that an adapter unit execution file 111 is generated. The API calling logic unit creation process is completed by obtaining the adapter unit execution file 111. The adapter unit execution file 111 is used in an adapter registration process.

Adapter Registration Process

Next, a process of an adapter registration process will be described.

Figure 15:
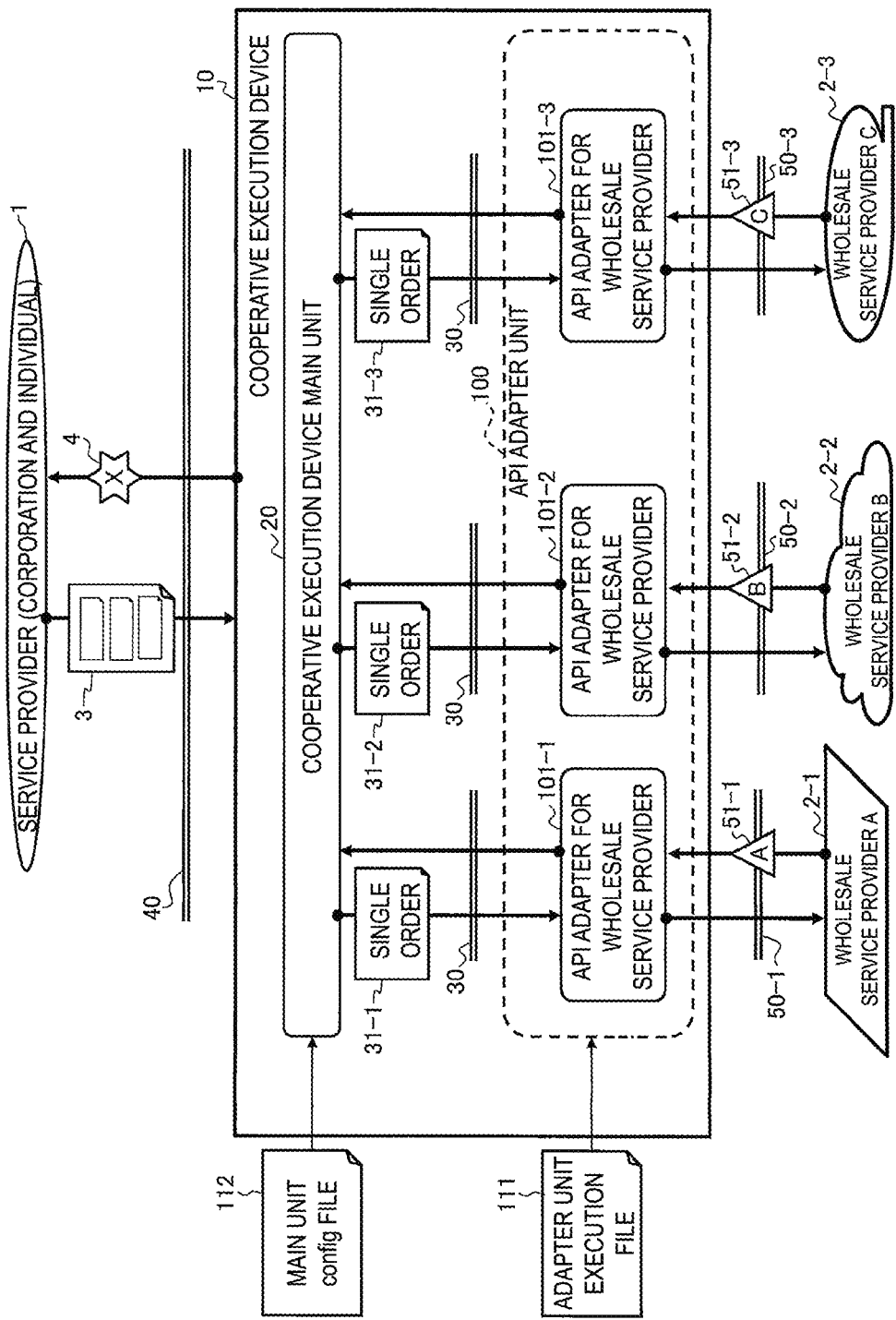
FIG. 15 is a diagram illustrating an adapter registration process of the API adapter according to the embodiment of the present invention.

FIG. 15 is a diagram illustrating the adapter registration process. Components that are the same as those in FIG. 1 are denoted by the same reference signs.

The adapter registration process is a process of registering, in the API adapter unit 100, the adapter unit execution file 111 created in the API calling logic unit creation process in FIG. 14. By registering the adapter unit execution file 111 in the API adapter unit 100, the API adapter unit 100 can absorb the API specification difference provided by each wholesale service provider in the most recent specification.

As illustrated in FIG. 15, the API adapter unit 100 disposes the created adapter unit execution file 111 and a main unit config file 112 in a predetermined folder. The main unit config file 112 designates a name of an adapter to be newly added, or the like.

The cooperative execution device main unit 20 designates the name of the adapter to be newly added, or the like in the main unit config file 112.

As described above, the adapter unit execution file 111 is registered in the API adapter unit 100, and a config setting is performed to designate a name or the like of an adapter to be newly added with the main unit config file 112 in the cooperative execution device main unit 20, thereby completing the adapter registration process, such that the API adapter unit 100 can be caused to adapt to a new wholesale service/specification change.

As described above, the API adapter creation method of the embodiment includes the following processes.

(1) Order Reception Unit Incorporation Process

A process of receiving the single order 31 from the cooperative execution device main unit 20 that disassembles the cooperation order 3 from the service provider 1 into the single orders 31, and performing the process for response to the cooperative execution device main unit 20, by the API adapter 100 for use in the cooperative execution device 10 in which the service provider 1 collectively builds a cooperation service that is a combination of services of a plurality of wholesale service providers providing a wholesale service.

(2) API Calling Logic Unit Creation Process

A process of activating the wholesale service provider API 50 in a determined sequence of execution based on the activation condition of the wholesale service provider API 50, extracting a parameter necessary for execution of the wholesale service provider API 50 from within the single order 31, transmitting the parameter to the wholesale service provider API execution unit incorporation process, and converting an execution result of the wholesale service provider API 50 to a data format distributable to the cooperative execution device main unit 20.

(3) Wholesale Service Provider API Execution Unit Creation Process and Incorporation Process A process of receiving data necessary for execution of the wholesale service provider API from the API calling logic unit 120, and reassembling the data in the form of an HTTP request, transmitting the data to the wholesale service provider 2, receiving an HTTP response from the wholesale service provider 2, performing status code check and an exception issuing process, and acquisition of a response header and body, and reassembling the data in an appropriate format, and returning the resultant data to the API calling logic unit 120.

This allows the API adapter unit, which is a service-dependent unit, to be efficiently created in following a new wholesale service/specification change.

In the embodiment, the method further includes the wholesale service provider API execution unit generation process (see FIG. 12) for automatically generating the wholesale service provider API execution unit source code 104 based on the wholesale service provider API specification document 102, and generating the wholesale service provider API execution unit specification document 105 from the automatically generated wholesale service provider API execution unit source code 104. This eliminates the need for development of the wholesale service provider API execution unit. Further, the generated wholesale service provider API execution unit specification document 105 can be provided to the wholesale service provider API execution unit incorporation process (see FIG. 13) as the next process, as illustrated in FIG. 12.

In the embodiment, in the wholesale service provider API execution unit incorporation process (see FIG. 13), the common library source code 106 and the generated wholesale service provider API execution unit source code 104 are incorporated into the API calling logic unit template source code 107. With the common library source code 106, it is possible to incorporate the wholesale service provider API execution unit source code 104 into the API calling logic unit template source code 107 using common library resources efficiently. It is possible to provide the API calling logic unit template source code 107 into which the wholesale service provider API execution unit source code 104 has been incorporated, to the API calling logic unit creation process (see FIG. 14) as the next process, as illustrated in FIG. 12. It is possible to be efficiently create the wholesale service provider API execution unit 130 of the API adapter unit 100 (see FIG. 3).

In the embodiment, in the API calling logic unit creation process (see FIG. 14), an adapter unit source code 114 is implemented based on a template source code in which the common library and the wholesale service provider API execution unit source code 104 have been incorporated, and various manual and specification documents, and the created adapter unit source code 114 is built so that the adapter unit execution file 111 is generated. In technologies (Non-Patent Literatures 1 and 2) in the related art, there is a problem that a method of creating an API adapter is not described, and the technologies are not efficient due to a need for manual implementation of common units or units that can be automatically generated, when a configuration of the API adapter described in the existing technologies is implemented as it is.

On the other hand, in the embodiment, it is possible to create the adapter unit execution file 111 by combining the wholesale service provider API execution unit generation process, common library and wholesale service provider API execution unit incorporation process, and the API calling logic unit creation process. Because the adapter unit execution file 111 can be created efficiently, adapting to a new API is facilitated. For example, the API adapter unit 100 can easily adapt to a new wholesale service/specification change. Thus, it is possible to efficiently create the API adapter unit 100 by combining the wholesale service provider API execution unit generation process, the common library and wholesale service provider API execution unit incorporation process, and the API calling logic unit creation process.

In the embodiment, with an adapter registration processing process of registering, in the API adapter unit 100, the adapter unit execution file 111 created in the logic unit creation process, it is possible to register the adapter unit execution file 111 in the API adapter unit 100 and cause the API adapter unit 100 to adapt to a new wholesale service/specification change.

Further, all or some of the processes described as being performed automatically among the respective processes described in the embodiment can be performed manually, or all or some of the processes described as being performed manually can be performed automatically using a known method. In addition, information including the processing procedures, control procedures, specific names, and various types of data and parameters shown in the aforementioned documents or drawings can be arbitrarily changed except for specially described cases. Further, the respective components of the devices, which have been shown, are functional and conceptual ones, and are not necessarily physically configured as shown. That is, a specific form of distribution and integration of the respective devices is not limited to the illustrated one, and all or a portion thereof can be configured to be functionally or physically distributed and integrated in any units, according to various loads, use situations, and the like.

Further, some or all of the configurations, functions, processing units, processing apparatus, and the like may be realized in hardware by designing some or all of them in an integrated circuit, for example. Further, the configurations, the functions, and the like may be realized in software enabling a processor to interpret and execute a program that realizes the respective functions. Information such as programs, tables, and files that realize respective functions can be held in a recording device such as a memory, a hard disk, or a solid state drive (SSD), or a recording medium such as an integrated circuit (IC) card, a secure digital (SD) card, or an optical disc. Further, in the specification, processing steps describing time-series processes includes not only processes performed in time series according to a described sequence, but also processes in parallel or individually executed (for example, parallel processes or object-based on processes) without being necessarily processed in time series.

REFERENCE SIGNS LIST

1 Service provider
2, 2-1,2-2,2-3 Wholesale service provider
3, 3-1,3-2,3-3 Cooperation order
4 Service
10 Cooperative execution device
20 Cooperative execution device main unit
30 Cooperative execution device main unit API
31 Single order
31-1 Single order for NW service
31-2 Single order for Cloud service
31-3 Single order for APL service
40 Cooperative execution device API
50 Wholesale service provider API
51 Wholesale Service API (specification difference)
100 API adapter unit
101, 101-1, 101-2, 101-3 API adapter
110 Order reception unit (order reception apparatus)
120 API calling logic unit (API calling logic apparatus)
130 Wholesale service provider API execution unit (wholesale service provider API execution apparatus)

The invention claimed is:

1. An application program interface (API) adapter for use in a cooperative execution device for collectively building a cooperation service that is a combination of a plurality of wholesale services, the API adapter comprising: processor;
an order reception unit, including one or more processors, configured to receive a single order from a cooperative execution device main unit configured to disassemble an order of the cooperation service into single orders, and perform a process for responding to the cooperative execution device main unit; an API calling logic unit, including one or more processors, configured to activate a wholesale service provider API in a determined sequence of execution based on an activation condition of the wholesale service provider API, and extract a parameter necessary for execution of the wholesale service provider API from within the single order; and
a wholesale service provider API execution unit, including one or more processors, configured to receive the parameter necessary for execution of the wholesale service provider API from the API calling logic unit, reassemble the parameter into a request, make the request to the wholesale service provider API, receive an execution result as a response to the request, and reassemble the response into a predetermined format, and return the response to the API calling logic unit, wherein the API calling logic unit is further configured to convert the execution result of the wholesale service provider API to a data format distributable to the cooperative execution device main unit;
implementing by the API calling logic unit, an adapter unit source code based on (i) a template source code into which a common library and a wholesale service API execution unit source code have been incorporated, and (ii) one or more manual and specification documents, the created adapter unit source code being built to generate an adapter unit execution file.

2. The API adapter according to claim 1, further comprising: an auto-generation unit, including one or more processors, configured to automatically generate a wholesale service provider API execution unit source code based on a wholesale service provider API specification document, and generate a wholesale service provider API execution unit specification document from the automatically generated wholesale service provider API execution unit source code.

3. The API adapter according to claim 2, wherein the wholesale service provider API execution unit is further configured to incorporate a common library source code and the generated wholesale service provider API execution unit source code into a template source code of the API calling logic unit.

4. The API adapter according to claim 1, wherein the API calling logic unit is further configured to implement an adapter unit source code based on (i) a template source code into which a common library and a wholesale service API execution unit source code have been incorporated, and (ii) one or more manual and specification documents, the created adapter unit source code being built to generate an adapter unit execution file.

5. The AP adapter according to claim 4, wherein the API calling logic unit is further configured to register the created adapter unit execution file in the API adapter.

6. An API adapter creation method of creating an API adapter for use in a cooperative execution device for collectively building a cooperation service that is a combination of a plurality of wholesale services, the API adapter creation method comprising: receiving, by an order reception unit including one or more processors, a single order from a cooperative execution device main unit configured to disassemble an order of the cooperation service into single orders; activating, by an API calling logic unit including one or more processors, a wholesale service provider API in a determined sequence of execution based on an activation condition of the wholesale service provider API; extracting, by the API calling logic unit, a parameter necessary for execution of the wholesale service provider API from within the single order, receiving, by a wholesale service provider API execution unit including one or more processors, the parameter necessary for execution of the wholesale service provider API from the API calling logic unit, reassembling the parameter in the form of a request, and requesting the wholesale service provider API; receiving an execution result as a response to the request, reassembling the response into predetermined format, and returning the response to the API calling logic unit; converting, by the API calling logic unit, the execution result of the wholesale service provider API to a data format distributable to the cooperative execution device main unit; and performing, h the order reception unit, a process for responding to the cooperative execution device main unit;
implementing, by the API calling logic unit, an adapter unit source code based on (i) a template source code into which a common library and a wholesale service API execution unit source code have been incorporated, and (ii) one or more manual and specification documents, the created adapter unit source code being built to generate an adapter unit execution file.

7. The API adapter creation method according to claim 6, further comprising: automatically generating a wholesale service provider API execution unit source code based on a wholesale service provider API specification document, and generating a wholesale service provider API execution unit specification document from the automatically generated wholesale service provider API execution unit source code.

8. The API adapter creation method according to claim 7, further comprising: incorporating, by the wholesale service provider API execution unit, a common library source code and the generated wholesale service provider API execution unit source code into a template source code of the API calling logic unit.

9. The API adapter creation method according to claim 6, further comprising: registering, by the API calling logic unit, the created adapter unit execution file in the API adapter.

10. A non-transitory computer readable medium storing instructing that when executed by a computer cause the computer to function as an API adapter for use in a cooperative execution device for collectively building a cooperation service that is a combination of a plurality of wholesale services, the API adapter comprising: an order reception apparatus, including one or more processors, configured to receive a single order from a cooperative execution device main unit configured to disassemble an order of the cooperation service into single orders; an API calling logic apparatus, including one or more processors, configured to activate a wholesale service provider API in a determined sequence of execution based on an activation condition of the wholesale service provider API and extract a parameter necessary for execution of the wholesale service provider API from within the single order; and a wholesale service provider API execution apparatus, including one or more processors, configured to receive the parameter necessary for execution of the wholesale service provider API from the API calling logic apparatus, reassemble the parameter into a request, male the request to the wholesale service provider API, receive an execution result as a response to the request, and reassemble the response in a predetermined format, and return the response to the API calling logic apparatus, wherein the API calling logic apparatus is further configured to convert the execution result of the wholesale service provider API to a data format distributable to the cooperative execution device main unit;

implementing, by the API calling logic unit, an adapter unit source code based on (i) a template source code into which a common library and a wholesale service API execution unit source code have been incorporated and (ii) one or more manual ands specification documents, the created adapter unit source code being built to generate an adapter unit execution file.

11. The non-transitory computer readable medium according to claim 10, wherein the API adapter further comprises: an auto-generation apparatus, including one or more processors, configured to automatically generate a wholesale service provider API execution unit source code based on a wholesale service provider API specification document, and generate a wholesale service provider API execution unit specification document from the automatically generated wholesale service provider API execution unit source code.

12. The non-transitory computer readable medium according to claim 11, wherein the wholesale service provider API execution apparatus is further configured to incorporate a common library source code and the generated wholesale service provider API execution unit source code into a template source code of the API calling logic apparatus.

13. The non-transitory computer readable medium according to claim 10, wherein the API calling logic apparatus is further configured to implement an adapter unit source code based on (i) a template source code into which a common library and a wholesale service API execution unit source code have been incorporated, and (ii) one or more manual and specification documents, the created adapter unit source code being built to generate an adapter unit execution file.

14. The non-transitory computer readable medium according to claim 13, wherein the API calling logic apparatus is further configured to register the created adapter unit execution lilt in the API adapter.

* * * * *